United States Patent
Pinkerton

(10) Patent No.: US 9,638,182 B2
(45) Date of Patent: May 2, 2017

(54) GRAPHENE-TROUGH PUMP SYSTEMS

(71) Applicant: Clean Energy Labs, LLC, Austin, TX (US)

(72) Inventor: Joseph F. Pinkerton, Austin, TX (US)

(73) Assignee: Clean Energy Labs, LLC, Austin, TX (US)

( * ) Notice: Subject to any disclaimer, the term of this patent is extended or adjusted under 35 U.S.C. 154(b) by 621 days.

(21) Appl. No.: 13/802,092

(22) Filed: Mar. 13, 2013

(65) Prior Publication Data

US 2014/0271238 A1 Sep. 18, 2014

(51) Int. Cl.
F04B 19/04 (2006.01)
F04B 43/04 (2006.01)

(52) U.S. Cl.
CPC ............ F04B 19/04 (2013.01); F04B 43/043 (2013.01)

(58) Field of Classification Search
CPC ....... B82Y 30/00; B82Y 99/00; F04B 19/006; F04B 43/043
USPC ........................................................ 244/169
See application file for complete search history.

(56) References Cited

U.S. PATENT DOCUMENTS

| | | | | |
|---|---|---|---|---|
| 5,336,062 | A * | 8/1994 | Richter | 417/413.2 |
| 6,524,532 | B1 * | 2/2003 | Northrup | 422/547 |
| 7,505,110 | B2 | 3/2009 | Furukawa et al. | |
| 2002/0153583 | A1 | 10/2002 | Frazier et al. | |
| 2004/0124085 | A1 * | 7/2004 | Tai et al. | 204/600 |
| 2004/0238907 | A1 | 12/2004 | Pinkerton | |
| 2004/0239210 | A1 * | 12/2004 | Pinkerton et al. | 310/309 |
| 2004/0245406 | A1 * | 12/2004 | Guiheen et al. | 244/169 |
| 2005/0141999 | A1 * | 6/2005 | Bonne | 417/48 |
| 2007/0081681 | A1 | 4/2007 | Yu et al. | |
| 2008/0116764 | A1 | 5/2008 | Heim | |
| 2008/0245985 | A1 | 10/2008 | Heim | |
| 2011/0250819 | A1 * | 10/2011 | Tashman | 446/46 |
| 2012/0308415 | A1 * | 12/2012 | Pinkerton | 417/413.1 |

FOREIGN PATENT DOCUMENTS

| | | |
|---|---|---|
| WO | 2010039983 A2 | 4/2010 |
| WO | 2011097390 A1 | 8/2011 |
| WO | 2012051053 A1 | 4/2012 |

OTHER PUBLICATIONS

Patent Cooperation Treaty, PCT International Search Report, Issued in Connection with PCT/US09/59266; Jan. 14, 2010; 6 pages; Europe.

Patent Cooperation Treaty, PCT Written Opinion of the International Searching Authority, Issued in Connection with PCT/US09/59266; Jan. 14, 2010; 9 pages; Europe.

Patent Cooperation Treaty, PCT International Search Report, Issued in Connection with PCT/US11/23618; Apr. 3, 2011; 3 pages; U.S.

Patent Cooperation Treaty, PCT Written Opinion of the International Searching Authority, Issued in Connection with PCT/US11/23618; Apr. 3, 2011; 8 pages; U.S.

(Continued)

*Primary Examiner* — Patrick Hamo
(74) *Attorney, Agent, or Firm* — Dickinson Wright PLLC; Ross Spencer Garsson

(57) ABSTRACT

The present invention relates to pump systems having graphene or other atomically thin electrically conductive materials supported by trough-shaped cavities.

28 Claims, 37 Drawing Sheets

(56) References Cited

OTHER PUBLICATIONS

Lee et al.; "Measurement of the Elastic Properties and Intrinsic Strength of Monolayer Graphene;" Science, 2008; vol. 321; pp. 385-3883.
J. Ogawa et al.; "Development of Liquid Pumping Devices Using Vibrating Microchannel Walls;" Sensors and Actuators A, 152; 2009; pp. 211-218.
B. Wu et al.; "High Aspect Ratio Silicon Etch: A Review;" Journal of Applied Physics, 108; 2012; pp. 1-20.
Bunch, J. Scott, et al.; Impermeable Atomic Membranes from Graphene Sheets; Nano Letters, vol. 8, No. 8, , May 21, 2008.2008, pp. 2458-2462.
International Search Report and Written Opinion, PCT/US2014/026060, Oct. 14, 2014, 15 pages.

\* cited by examiner

201

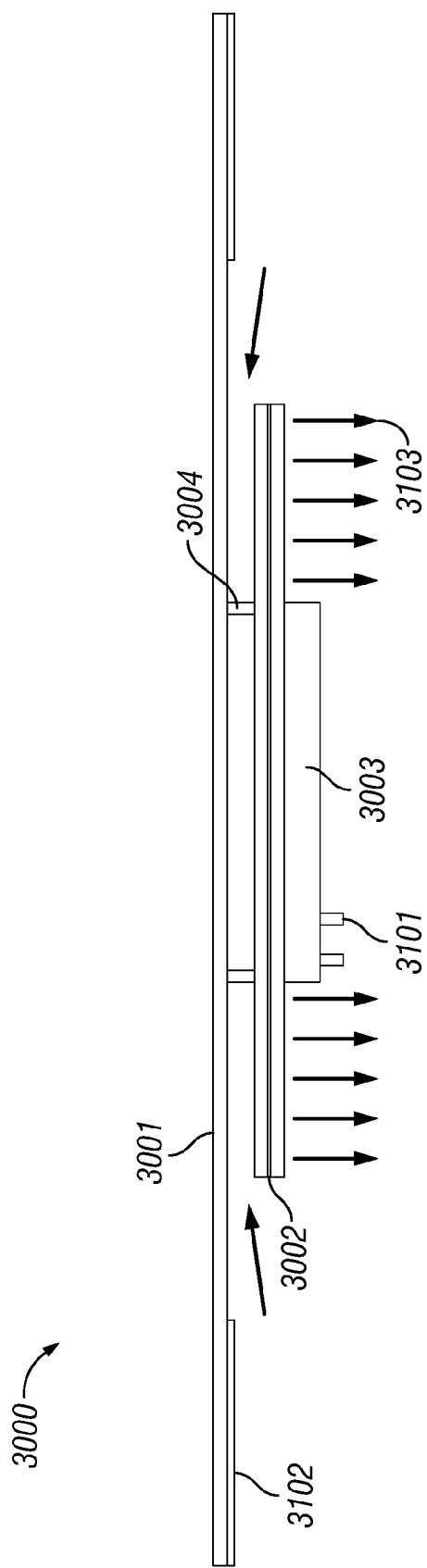

GRAPHENE-TROUGH PUMP SYSTEMS

TECHNICAL FIELD

The present invention relates to pump systems utilizing graphene supported by trough-shaped cavities.

SUMMARY OF THE INVENTION

PCT Patent Appl. No. PCT/US11/23618, entitled "Graphene-Drum Pump and Engine Systems," (Pinkerton '618 Application) disclosed pump systems and engine systems having graphene membranes. In embodiments of those systems, the graphene membranes could be utilized in the main chambers and/or valves of the pumps and engines. A graphene membrane is atomically thin.

Graphene membranes (also otherwise referred to as "graphene drums") have been manufactured using process such as disclosed in Lee et al. Science, 2008, 321, 385-388. PCT Patent Appl. No. PCT/US09/59266 (Pinkerton '266 Application) (the "PCT US09/59266 Application") described tunneling current switch assemblies having graphene drums. As described in the Pinkerton '266 Application, the graphene drum is capable of sealing the chamber formed by the graphene drum (i.e., the graphene drum provides a seal to fluids (liquids and gases) inside and outside the chamber).

It has been discovered that the graphene can be utilized in trough-shaped cavities as the pumping element, i.e., a "graphene-trough pump." In some embodiments, two or more graphene valves are located within the same trough-shaped cavity as the pumping element, and thus can be advantageously used in similar capacities as set forth and described in the Pinkerton '618 Application.

Such advantages include that the air (or other gas) flowing from the graphene valve to the pumping element is less constricted and the graphene valve to graphene pump channels are eliminated by the use of the graphene trough pump system.

Another advantage is that the graphene valves and pumping element can be made of the same piece of graphene and cavity (which makes the system compact and lowers manufacturing cost). Yet another advantage of this system is its ability to use through silicon vias (TSVs). A small TSV (that can be etched from the top) can be connected with a larger TSV etched from the bottom of the wafer, which makes top to bottom alignment much easier.

Another advantage is that the pumping gate can be broken into sections, allowing more flexibility as to how the graphene is moved in the system. By using these sections, the graphene can be moved in a traveling wave, which causes the air (or other gas) to be displaced in a more controlled velocity and direction. This is in comparison to a graphene drum in which the membrane moves up and down and displaces the air (or other fluid) similar to a standing wave.

In J. Ogawa et al., "Development of liquid pumping devices using vibrating microchannel walls," *Sensors and Actuators* A, 152 (2009) 211-218 (Ogawa), Ogawa et al. described the use of a traveling wave on top of a channel to move fluids (usually liquids) from one side of the channel to the other. As disclosed and taught in Ogawa, the actuation membranes utilized were made of several different materials and were over 8 microns thick (over 20,000 times the thickness of the graphene used in the present invention). The mass and thickness of this composite membrane make it difficult (if not impossible) to achieve large amplitude membrane deflections at high frequency (due to the relatively high inertial mass and stiffness of Ogawa's membranes). As a result, the pumping speed of the pump disclosed and taught in Ogawa is several orders of magnitude less than is achieved by the embodiments of the present invention.

It is also an advantage of the present invention (especially for use in audio speakers) that the embodiment of the present invention can exhaust air directly out of the cavity.

The requirement for having valves at all is eliminated by the graphene-trough pump system while maintaining a valve-like effect during operation. Thus, while valves can be utilized in embodiments of the invention, embodiments of the invention can pump air (and other fluids) even in the absence of valves.

As used herein, a "graphene-trough pump" is a pump that utilizes a layer of graphene located within a trough-shaped cavity as the pumping element. A "graphene-trough pump system" is a pump system that utilizes one or more graphene-trough pumps.

As used herein, "deflection" of the graphene is measured relative to the non-deflected graphene (i.e., the deflection of non-deflected graphene is zero). As compared to the graphene membranes discussed and described in the Pinkerton '618 Application, embodiments of the present invention can move in a traveling wave such that the point of maximum deflection of the graphene moves in a controlled manner, such as along an axis of the trough (generally along the longer axis).

In some instances, it is advantageous to use two or more graphene-trough pumps stacked on top of one another for use as a unit. Such a stack of two or more graphene-trough pumps are referred to as a "multilayer graphene-trough pump stack." While each of the individual graphene layers of a multilayer graphene-trough pump stack is atomically thin, the multilayer graphene-trough pump stack itself generally is not.

Stacking the graphene-trough pumps is advantageous because this will increase pumping speed, thereby, for example, increasing audio output if operated as a speaker. This approach can increase the pumping rate for a given volume/mass by approximately 50 times. This is quite beneficial. For instance, in the case where the pumps are being used for propulsion, the thrust-to-weight ratio of the device (which is already very high) can be increased by around 50 times using this thin chip approach.

Alternatively to using graphene by itself, other types of electrically conductive materials that are atomically thin (less than 100 nm) may be utilized in lieu of graphene in embodiments of the present invention, such as, for example, reduced graphene oxide.

Moreover, the electrically conductive materials may include a thin (i.e., several nanometers in thickness) protective coating to protect the electrically conductive membranes from oxidation or corrosive fluids. For instance, a protective coating of graphene oxide or tungsten can be applied to the graphene.

As compared to the prior art, embodiments of the present invention utilize graphene (or other atomically thin electrically conductive material) in a trough-shaped support (the layer of material is supported on all sides).

Certain embodiments of the present invention are valveless wave pumps that utilize graphene (or atomically thin electrically conductive materials).

Embodiments of the present invention can make use of three or more separately controlled gates located within each trough-shaped support or cavity to deflect the graphene (or other atomically thin electrically conductive materials).

Embodiments of the present invention (such as those without valves) can utilize a moveable membrane that also acts as the electrical conductor required for actuation.

Certain embodiments of the present invention include at least one through silicon via (TSV). For instance, valved embodiments of the present invention generally include two TSVs.

Large arrays of g-trough pumps can usually use a serpentine gate structure to limit the number of electrical connections. These large arrays will usually include a thin (around 100 nm) layer of oxide on the gates to prevent electrical shorting. The airflow is generally perpendicular to the straight/long sections of the serpentine gates traces.

Certain embodiments of the present invention are double-flow valveless wave pump embodiments that are capable of pulling on both sides of the membrane with electrostatic forces. Other embodiments must rely on the graphene restoration force alone for that part of the cycle.

Certain embodiments of the present invention are double-flow embodiments that can distort the graphene (or other atomically thin electrically conductive material) so that there is a net zero pressure change within the trough-shaped support area (which can increase pumping speed because the graphene does not need to fight the forces generated by a pressure differential).

In general, in one aspect, the invention features a pump that includes a first cavity having a first inlet and a first outlet. The pump further includes a first plurality of electrically conductive traces located within said first cavity. The pump further includes a continuous sheet of electrically conductive material spaced apart from and in close proximity to the first plurality of electrically conductive traces. The first plurality of electrically conductive traces are operable for creating a first time-varying deflection in the electrically conductive material. The first time-varying deflection moves in the first cavity from the first inlet to the first outlet.

Implementations of the invention can include one or more of the following features:

The electrically conductive material can be atomically thin.

The electrically conductive material can include of a continuous sheet of carbon atoms.

The electrically conductive material can include of graphene.

The electrically conductive material can include of multiple layers of graphene.

The first inlet can be connected to a first side of an inlet via.

The inlet via can be connected to a filter.

The filter can be hydrophobic.

The first outlet can be connected to an outlet via.

The first cavity can be trough-shaped.

The first plurality of electrically conductive traces can be operable for pulling the electrically conductive material toward the first plurality of electrically conductive traces.

The first time-varying deflection can be a first traveling wave that moves in the first cavity from the first inlet to the first outlet.

The first plurality of electrically conductive traces can be operable for creating a second time-varying distortion in the electrically conductive material.

The plurality of electrically conductive traces can be operable for simultaneously creating a first time-varying distortion in the electrically conductive material and a second time-varying distortion in the electrically conductive material.

The first time-varying deflection can be a first traveling wave that moves in the first cavity from the first inlet to the first outlet. The second time-varying deflection can be a second traveling wave that moves in the first cavity from the first inlet to the first outlet.

The plurality of electrically conductive traces can be operable for simultaneously creating a first time-varying distortion in the electrically conductive material and a second time-varying distortion in the electrically conductive material.

The pump can further include a valve protrusion.

The distance between the valve protrusion and the electrically conductive material can be less than the distance between the first plurality of electrically conductive traces and the electrically conductive material.

A first electrically conductive trace of the plurality of electrically conductive traces can be near the valve protrusion.

The first electrically conductive trace can be a valve gate.

The first electrically conductive trace can be a valve position sensor.

One electrically conductive trace of the plurality of electrically conductive traces can be connected to electrical ground.

The plurality of electrically conductive traces can be in the form of a serpentine pattern.

The pump can further include an electrically insulating layer between the plurality of electrically conductive traces and the electrically conductive material.

The pump can further include a second cavity. The first cavity can be located on one side of the electrically conductive material. The second cavity can be located on the other side of the electrically conductive material.

The pump can further include a second plurality of electrically conductive traces located within said second cavity.

The second plurality of electrically conductive traces can be operable for pulling the electrically conductive material toward the second plurality of electrically conductive traces.

The second cavity can be trough-shaped.

The first plurality of electrically conductive traces and the second plurality of electrically conductive traces can be operable for simultaneously pulling on the electrically conductive material.

The first inlet can be larger than said first outlet.

The pump can further include a fluid.

The fluid can be air.

The inlet via can be connected to a filter. The pump can be operable to move the fluid from the filter, through the first inlet, and to the first outlet.

The plurality of electrically conductive traces can be operable for pulling and releasing the electrically conductive material at a frequency in the MHz range.

The pump can be operable for use in an ultrasonic sensor.

In general, in another aspect, the invention features an ultrasonic sensor that includes one of the pumps of the above embodiments.

Implementations of the invention can include one or more of the following features:

The pump can be operable for sensing an ultrasonic sound.

In general, in another aspect, the invention features a pump system that includes a first array of the pumps of the above embodiments.

Implementations of the invention can include one or more of the following features:

The first array of the pumps can be in a first plane.

The pump system can further include a second array of pumps of the above embodiments. The second array of the pumps can be in a second plane.

The first plane and the second plane can be parallel.

In general, in another aspect, the invention features a communications system that includes a substrate and an array of pumps mounted on the substrate. The array of pumps are operable for operating at a first frequency to produce sound waves at a second frequency. The first frequency is higher than the second frequency.

Implementations of the invention can include one or more of the following features:

The first frequency can be in the MHz range.

The second frequency can be in the audio range.

The second frequency can be in the ultrasonic range.

The substrate can be transparent.

The communication system can further include a display. The transparent substrate can overlay the display.

The communication system can further include a battery.

The battery can be a rechargeable battery.

The communication system can further include an electronics system.

The pumps in the array of pumps can include a plurality of electrically conductive gates.

The electronics system can be operable for converting digital audio files into electric signals and for routing the electrical signals to the gates.

The electronics system can further include a radio.

The radio can be operable to receive signals from an external device.

The he external device can be a mobile computer.

The communication system can further include motion detectors.

The motion detectors are ultrasonic motion detectors.

The motion detectors and the array of pumps can be operable to produce movement of the communications system.

The motion detectors and the array of pumps can be operable to produce movement of the communications to minimize damage when the communications system is in free fall.

The communication system can further include lights.

The communication system can be operable for use to complete mobile payment transactions.

The array of pumps comprises pumps of the above embodiments.

In general, in another aspect, the invention features a device that includes a mobile platform and an array of electrostatic pumps located within or on the mobile platform. The array of electrostatic pumps are operable for creating a reaction force that is sufficient to allow the mobile platform to fly.

Implementations of the invention can include one or more of the following features:

The device can further include a solar cell.

The device can further include a speaker.

The device can further include a light.

The device can further include a robotic gripper.

The device can further include an ultrasonic sensor.

The device can further include a GPS tracking system.

The device can further include a battery.

The battery can be a rechargeable battery.

The battery can be removable from the device.

The device can further include a solar cell. The solar cell can be operable for charging the battery.

The device can further include a charging system.

The charging system can be stationary and can be connected to an electrical grid.

The device can further include a filter system.

The mobile platform can include solar cell material that can be used as a solar cell.

The solar cell material can be operably usable as a solar cell.

The material can be silicon.

The mobile platform can include transparent material.

The array of pumps can be operable to simultaneously produce the reaction force and a sound.

The sound can be an ultrasonic sound.

The device can further include an ultrasonic sound detector.

The ultrasonic sound detector can include one or more pumps in the array of pumps. The one or more pumps can be operable for detecting the ultrasonic sound.

The device can be operable to use the ultrasonic sound and the detection of the ultrasonic sound to detect the existence and position of objects.

The device can further include a motion sensor.

The device can further include a solar cell. The array of pumps and the motion sensor can be operable to position the device at an angle to increase solar power input to the solar cell.

The device can further include a solar cell. The array of pumps and the motion sensor are operable to position the device at an angle to maximize solar power input to the solar cell.

The device can be operable for recharging an electric or hybrid vehicle.

In general, in another aspect, the invention features a method that includes the steps of operating one of the pumps of the above embodiments.

In general, in another aspect, the invention features a method that includes the steps of operating one of the ultrasonic sensors of the above embodiments.

In general, in another aspect, the invention features a method that includes the steps of operating one of the pump systems of the above embodiments.

In general, in another aspect, the invention features a method that includes the steps of operating one of the communication systems of the above embodiments.

In general, in another aspect, the invention features a method that includes the steps of operating one of the devices of the above embodiments.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

DESCRIPTION OF DRAWINGS

FIGS. 10E-10G depict the cross-sectional view of the graphene-trough pump 900 depicted in FIG. 9 reflecting a constant flow gating method, in which graphene 102 is moved utilizing a pair of traveling waves, with arrows 201 reflecting air (or other fluid flow) as the graphene 102 is deflected from section to section.

FIG. 31 depicts a side view the solar energy collection device 3100 shown in FIG. 31.

DETAILED DESCRIPTION

The present invention relates to pump systems utilizing graphene in trough-shaped cavities. Such pumps and systems can include, exclude, or partially exclude valves; can include, exclude, or partially exclude TSVs; can be double-sided; and can be a stack of multiple pump systems.

Valved Graphene-Trough Pump and System

Figure 1A:
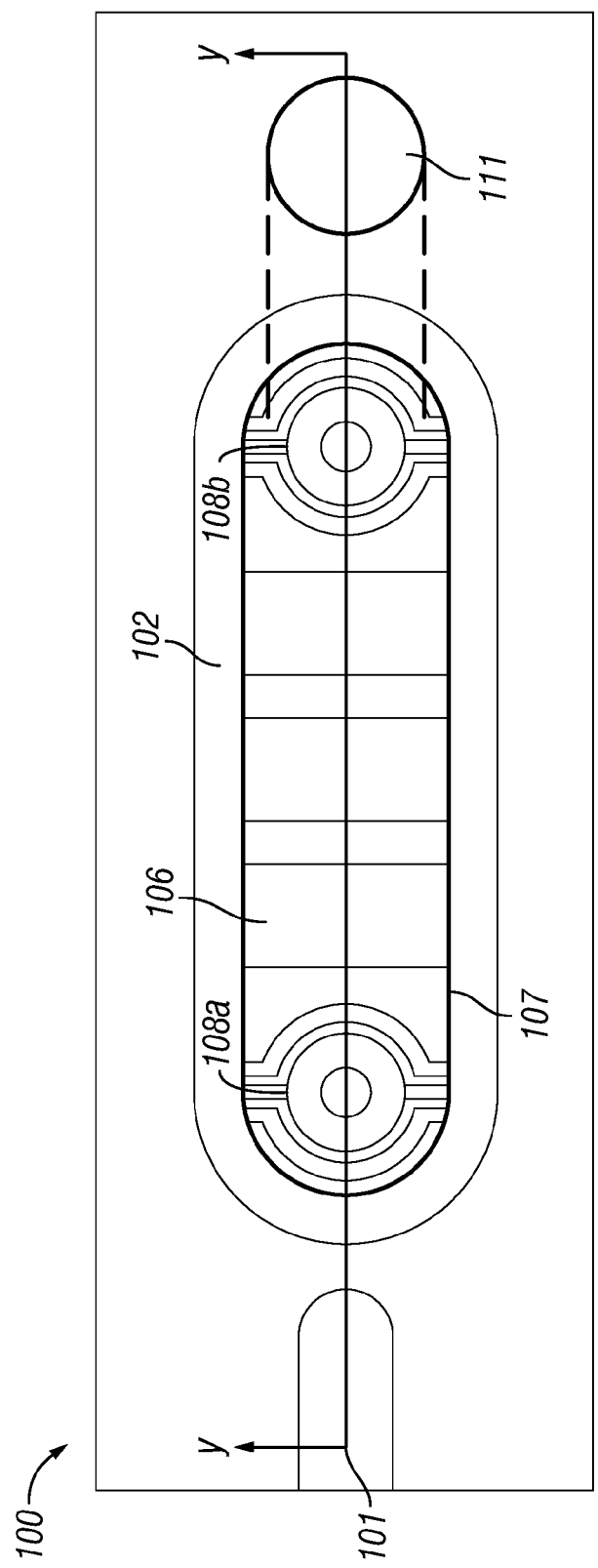
FIG. 1A depicts a graphene-trough pump 100 of the present invention.

In an embodiment of the present invention, one or more graphene-trough pumps can be utilized in a graphene-trough pump system. FIG. 1A depicts a graphene-trough pump 100 of the present invention. Graphene-trough pump 100 has graphene 102 spread across trough 107. Graphene-trough pump 100 further includes graphene valves 108*a* and 108*b* that can be made and utilized in the manner set forth in the Pinkerton '618 Application. Graphene-trough pump 100 further includes a series of gates 106 (gate sections) that are distributed between graphene valves 108*a* and 108*b* (section are distributed perpendicular to the axis of the trough 107). Air (or other gas) can be intaken into or exhausted from the graphene-trough pump 100 by the through silicon via (TSV) 110 (shown in FIG. 1B) and 111.

Figure 1B:
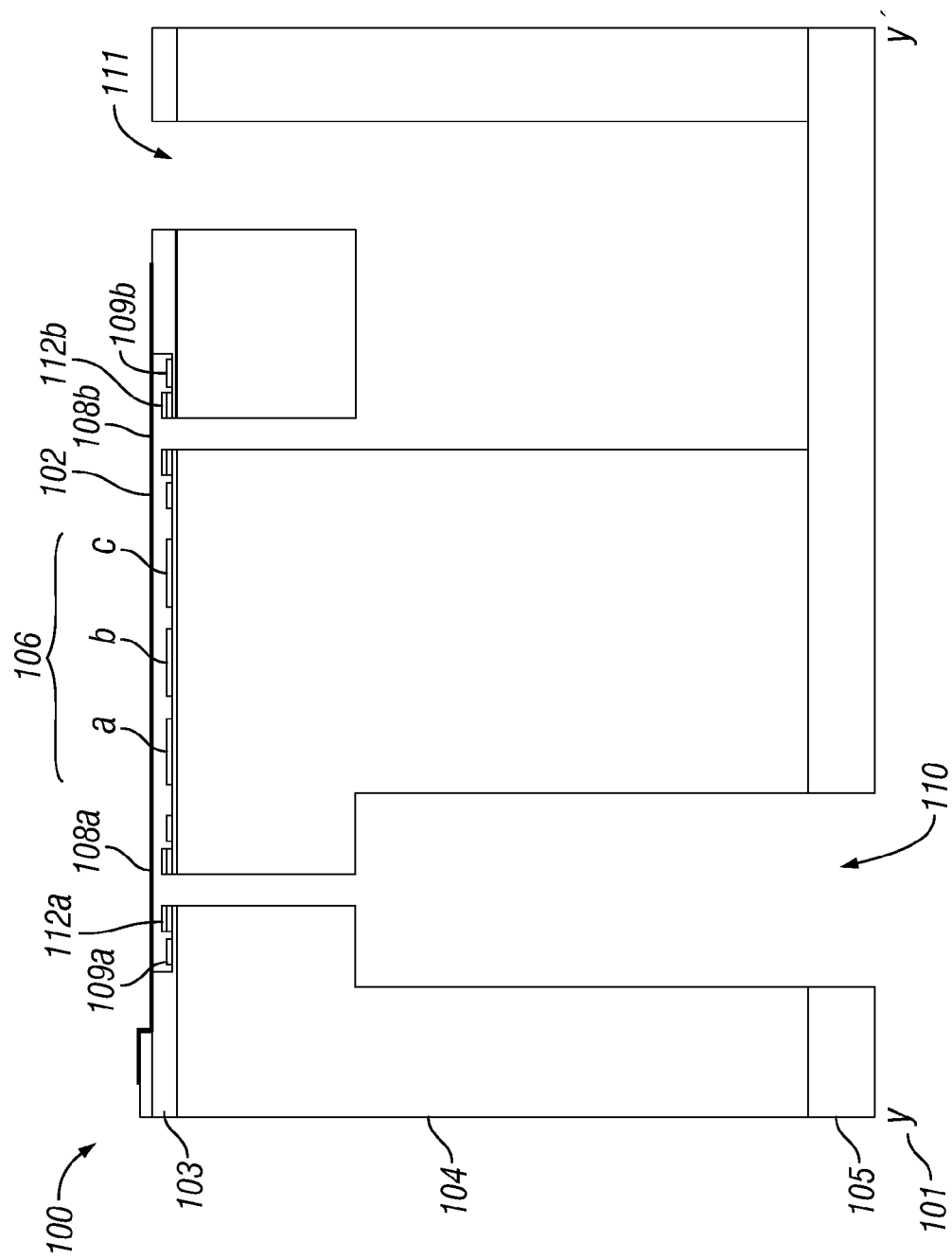
FIG. 1B depicts a cross-sectional view of the graphene-trough pump 100 depicted in FIG. 1A, taken from viewpoint 101 (y to y').

FIG. 1B depicts a cross-sectional view of the graphene-trough pump 100 depicted in FIG. 1A, taken from viewpoint 101 (y to y'). FIG. 1B shows that the same piece of graphene and cavity is used for the graphene valves 108*a* and 108*b* and the axis of the trough 107. In this embodiment, there are three gate sections 106 (gate sections 106*a*, 106*b*, and 106*c*) that are between the two graphene valves 108*a* and 108*b*. The gate sections are electrically conductive and are independently controlled such that the voltage across these gate sections 106*a*, 106*b*, and 106*c* can vary independently. Graphene valves 108*a* and 108*b* have gates 109*a* and 109*b*, respectively, in which gates can open and close graphene valves 108*a* and 108*b* independently. Gates 109*a* and 109*b* are independently controlled such that the voltage across gates 109*a* and 109*b* and gate sections 106*a*, 106*b*, and 106*c* can be varied independently from each other. Traces 112*a* and 112*b* may be connected to an electrical ground to prevent the oxide on top of these traces from developing unwanted electrical charges. As can be seen in FIG. 1B, these traces 112*a* and 112*b* have oxide at the top of the metallic trace (the place where the graphene 102 nearly comes into contact with the oxide) to prevent the graphene 102 from "running away" (due to the fact that the electrostatic force increases as the inverse square of the distance between the graphene and gate) and impacting the gate oxide. In this case, the gates 109*a* and 109*b* on either side of traces 112*a* and 112*b* can be used to turn the valves on and off.

Graphene-trough pump 100 also includes oxide 103, silicon 104, and a backing material 105 (such as a polymer, bonded glass, etc.).

Through silicon vias (TSVs) 110 and 111 can be made, for example, by the processes discussed and disclosed in B. Wu et al., "High aspect ratio silicon etch: A review," *Journal of Applied Physics*, 108, (2012), 051101, 1-20. Such a process is particularly applicable when the graphene-trough pumps of the present invention are layered by stacking more than one silicon wafer.

FIGS. 2A-2J depict the cross-sectional view of the graphene-trough pump 100 depicted in FIG. 1B, in which graphene 102 is moved in a traveling wave, with arrows 201 reflecting air (or other fluid flow) as the graphene 102 is deflected from section to section. Similar to graphene-drum pump (described in the Pinkerton '618 Application), the application of a voltage between the graphene and a particular metal gates (valve gate or gate section) moves the graphene.

Figure 2A:
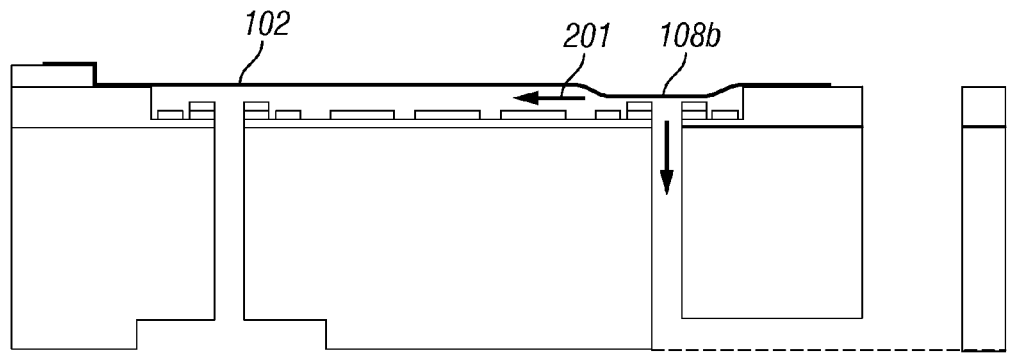
FIGS. 2A-2J depict the cross-sectional view of the graphene-trough pump 100 depicted in FIG. 1B, in which graphene 102 is moved in a traveling wave, with arrows 201 reflecting air (or other gas flow) as the graphene 102 is deflected from section to section.

As shown in FIG. 2A, a voltage has been applied to gate 109*b* to deflect the graphene to gate 109*b* (thus closing graphene valve 108*b*). This can be done as set forth in the Pinkerton '618 Application. By such deflection, air (or other fluid) will begin to flow away from the valve (due to displacement).

Figure 2B:
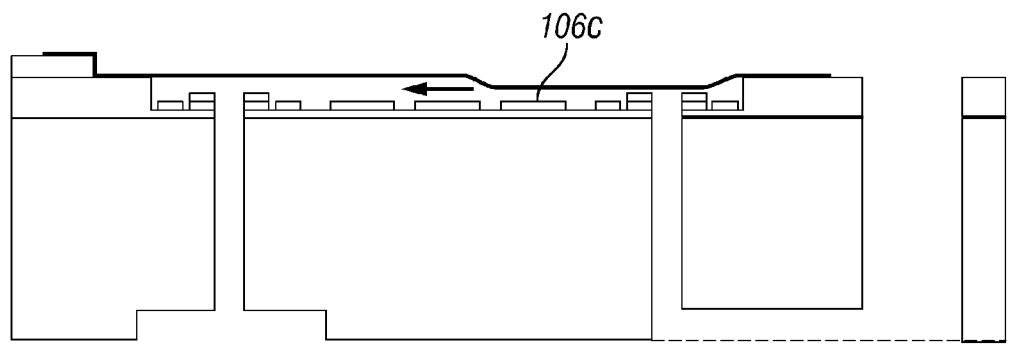

As shown in FIG. 2B, a voltage has been applied to gate section 106*c* such that the graphene 102 is now also deflected to that gate section 106*c*. As the voltage is still being maintained at gate 109*b*, graphene valve 108*b* remains in the closed position. By such further deflection, air (or other fluid) continues to flow toward graphene valve 108*a* (which is to the left as oriented in FIG. 2B).

Figure 2C:
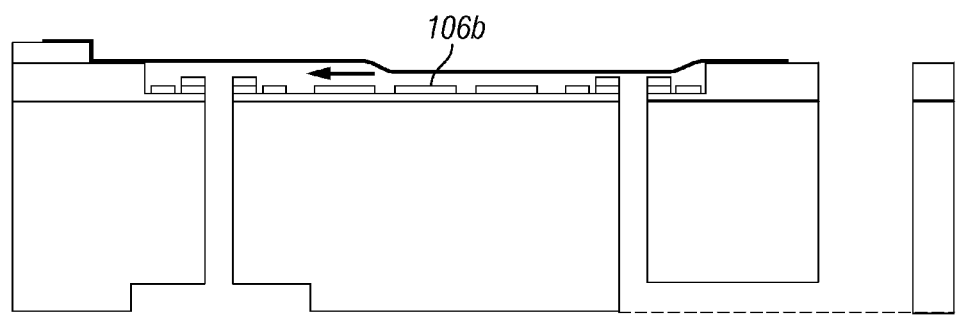

As shown in FIG. 2C, a voltage has been applied to gate section 106*b* such that the graphene 102 is now also deflected to that gate section 106*b*. As the voltage is still being maintained at gate 109*b* and gate section 106*c*, graphene 102 remains deflected to both gate 109*b* and gate section 106*c*. By such further deflection, air (or other gas) continues to flow toward graphene valve 108*a* (which is to the left as oriented in FIG. 2C).

Figure 2D:
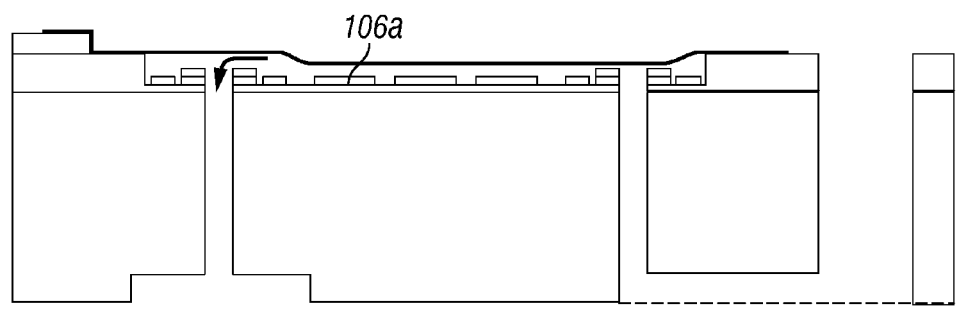

As shown in FIG. 2D, this process is continued by the application of a voltage to gate section 106*a* such that the graphene 102 is now also deflected to that gate section 106*a*. As the voltage is still being applied to gate 109*b* and gate sections 106*b* and 106*c*, the graphene 102 remains deflected as this gate 109*b* and these gate sections 106*b* and 106*c*. By such further deflection, air (or other fluid) continues to flow toward graphene valve 108*a* (which is to the left as oriented in FIG. 2D).

Figure 2E:
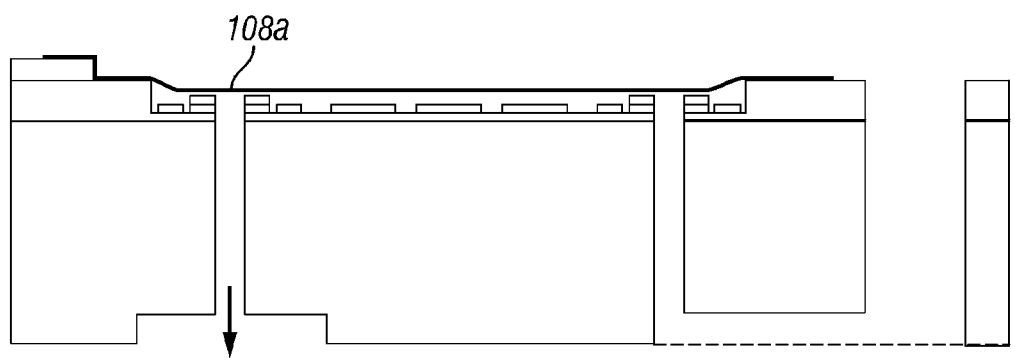

As shown in FIG. 2E, a voltage has been applied to gate 109*a* to deflect the graphene to gate 109*a* (thus closing graphene valve 108*a*). As the voltage is still being applied to gate 109*b* and gate sections 106*a*, 106*b* and 106*c*, the graphene 102 remains deflected as this gate 109*b* and these gate sections 106*a*, 106*b* and 106*c*. By such further deflection, air (or other gas) flows downward and is exhausted from graphene-trough pump 100 (which is to the bottom as oriented in FIG. 2E).

Figure 2F:
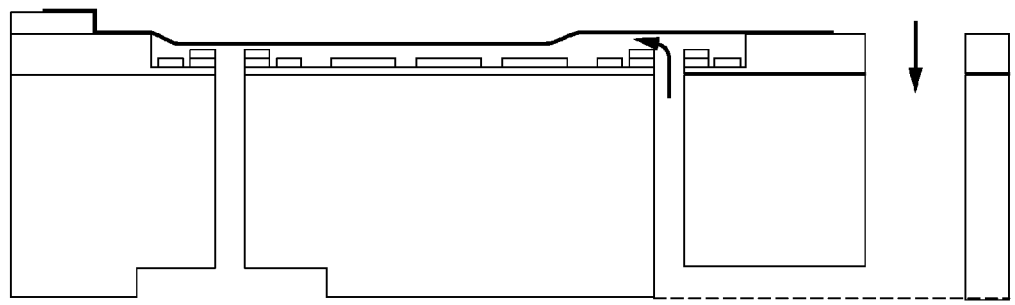

In FIG. 2F, the voltage that had been applied to gate 109*b* is now changed (either by not applying a voltage or applying a different voltage) so that graphene 102 is no longer deflected to gate 109*b* (thus opening graphene valve 108*b*). By such change of deflection, air (or other fluid) will begin to flow into the graphene-trough pump 100 (which is from the top as oriented in FIG. 2F) and through open graphene valve 108*b*.

Figure 2G:
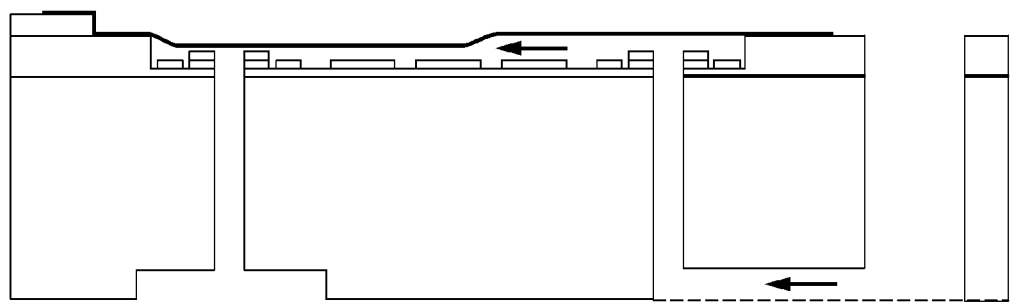

As shown in FIG. 2G, the voltage that had been applied to gate section 106*c* is now changed such that the graphene 102 is no longer deflected to that gate section 106*c*. By such change of deflection, air (or other fluid) continues to flow toward closed graphene valve 108*a* (which is to the left as oriented in FIG. 2G).

Figure 2H:
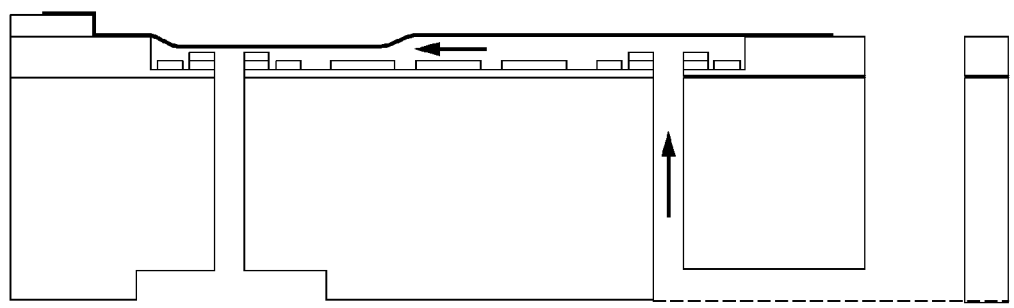

As shown in FIG. 2H, the voltage that had been applied to gate section 106*b* is now changed such that the graphene 102 is no longer deflected to that gate section 106*b*. By such change of deflection, air (or other fluid) continues to flow toward closed graphene valve 108*a* (which is to the left as oriented in FIG. 2H).

Figure 2I:
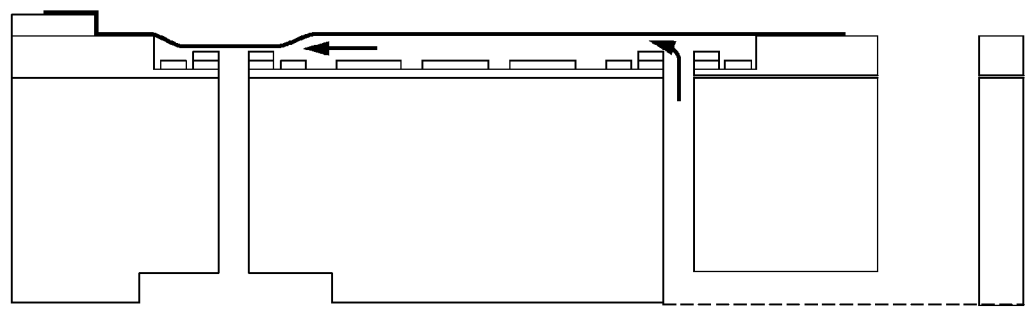

As shown in FIG. 2I, this process is continued by the change of the voltage applied to gate section 106*a* such that the graphene 102 is no longer deflected to that gate section 106*a*. By such change of deflection, air (or other fluid) continues to flow toward graphene valve 108*a* (which is to the left as oriented in FIG. 2I).

Figure 2J:
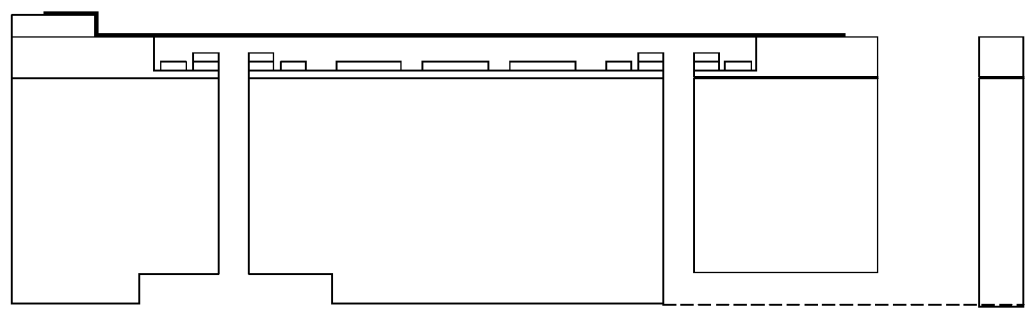

As shown in FIG. 2J, the voltage applied to gate 109*a* is now change such that graphene is no longer deflected to gate 109*a* (thus opening graphene valve 108*a*). By such change in deflection, the graphene-trough pump 100 is now in position to cycle through the pumping process again.

Valveless Graphene-Trough Pump and System

Figure 3A:
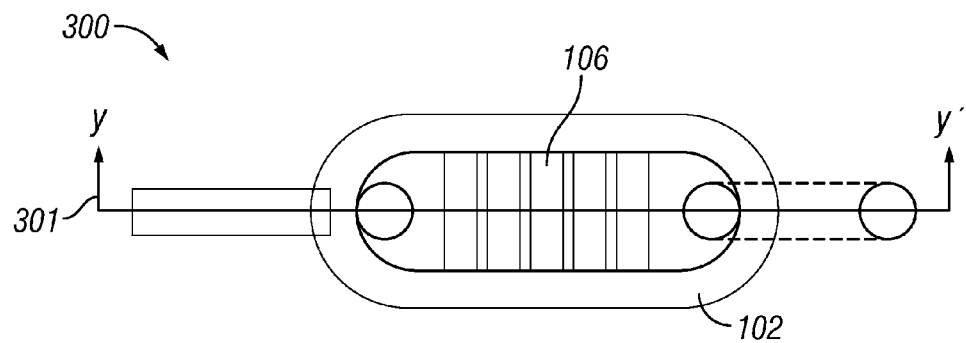
FIG. 3A depicts another graphene-trough pump 300 of the present invention. As compared to the graphene-trough pump depicted in FIG. 1A, this graphene-trough pump 300 does not include any explicit valves (although it does exhibit valve-like effects during its operation).
Figure 3B:
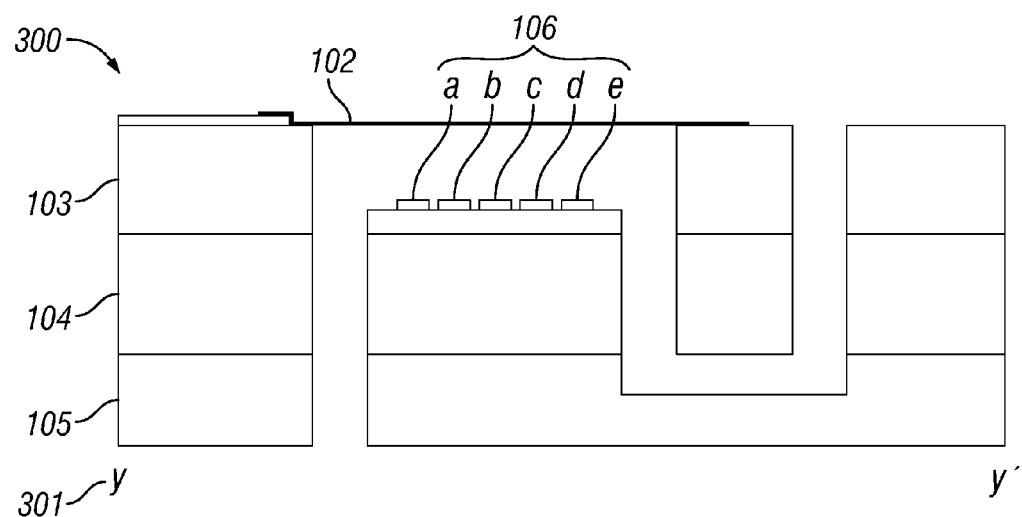
FIG. 3B depicts a cross-sectional view of the graphene-trough pump 300 depicted in FIG. 3A, taken from viewpoint 301 (y to y').

FIG. 3A depicts another graphene-trough pump 300 of the present invention. As compared to the graphene-trough pump depicted in FIG. 1A, this graphene-trough pump 300 does not include any explicit valves (although it does exhibit valve-like effects during its operation). In this instance, the graphene-trough pump 300 has five gate sections 106 (gates sections 106*a*, 106*b*, 106*c*, 106*d*, and 106*e* as shown in FIG. 3B). Due to the manner in which the graphene 102 is deflected in the graphene-trough pump there is some valve effect during operation of the graphene-trough pump 300.

FIG. 3B depicts a cross-sectional view of the graphene-trough pump 300 depicted in FIG. 3A, taken from viewpoint 301 (y to y').

Figure 4A:
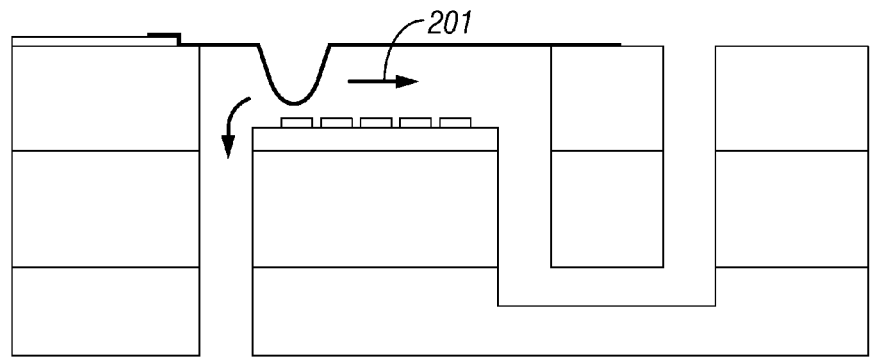
FIGS. 4A-4C depicts the cross-sectional view of the graphene-trough pump 300 depicted in FIG. 3B, in which graphene 102 is moved in a traveling wave, with arrows 201 reflecting air (or other gas flow) as the graphene 102 is deflected from section to section.
Figure 4B:
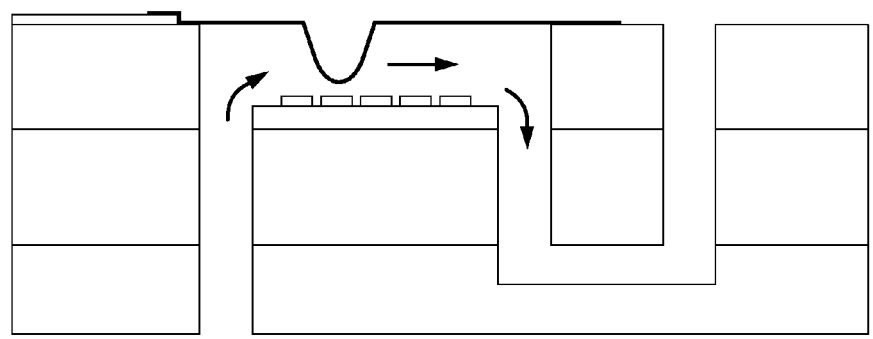
Figure 4C:
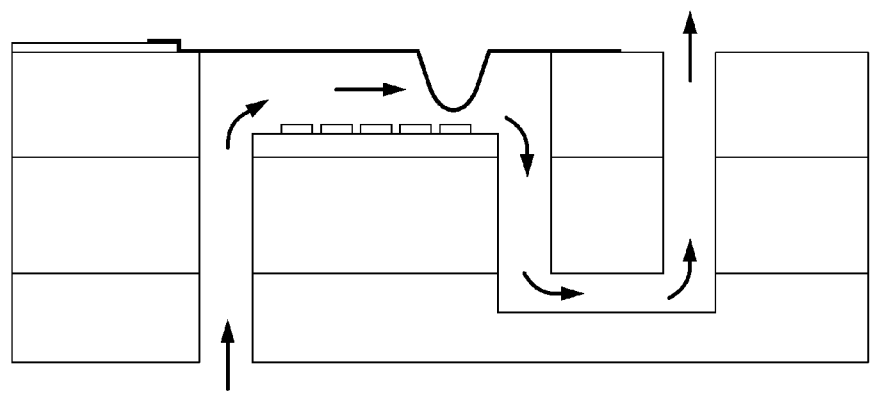

FIGS. 4A-4C depicts the cross-sectional view of the graphene-trough pump 300 depicted in FIG. 3B, in which graphene 102 is moved in a traveling wave, with arrows 201 reflecting air (or other fluid flow) as the graphene 102 is deflected from section to section. In this case, the traveling wave moves from left to right as oriented in FIGS. 4A-4C.

Similarly to the manner as described for FIGS. 2A-2J, the voltage applied by each of the gate section can be varied in a controlled order. As shown in FIGS. 4A-4C, the voltage is varied to pull a u-shaped portion of the graphene downward and then propagate the traveling wave. By proper phasing of the gates (similar to the phasing of a linear motor), it is possible to make the u-shaped depression in the graphene 102 move laterally (thus pushing air to the right as oriented in FIGS. 4A-4C). The airflow is shown to exit the top of graphene-trough pump 300 (as oriented in FIGS. 4A-4C) but can be reversed to exit out the bottom of the graphene-trough pump 300 (i.e., by making the u-shaped depression in the graphene move laterally from right to left). Graphene-trough pump 300 is bidirectional (as are the other graphene-trough pumps depicted herein). For certain uses of the graphene-trough pump, it may be advantageous to operate these graphene-trough pumps only in one direction (i.e., vacuum pumps, fans, etc.).

Single-TSV Graphene-Trough Pump and System

Figure 5A:
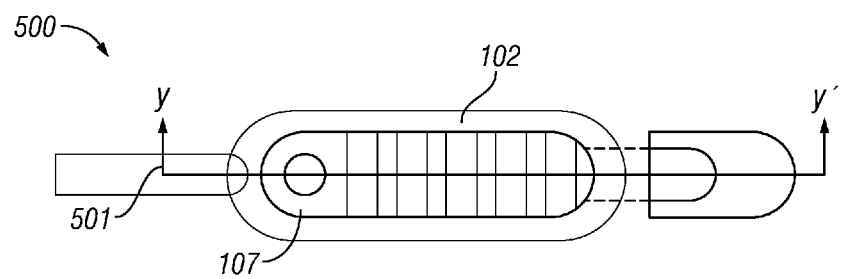
FIG. 5A depicts another graphene-trough pump 500 of the present invention. In this embodiment, a through silicon via (TSV) is used for the inlet while the air is ejected directly through opening 504, which is at the top of the graphene-trough pump 500 (as oriented in this FIG. 5A) (i.e., one of the TSVs depicted in graphene-trough pump 100 shown in FIG. 1A and graphene-trough pump 300 shown in FIG. 3A is eliminated).
Figure 5B:
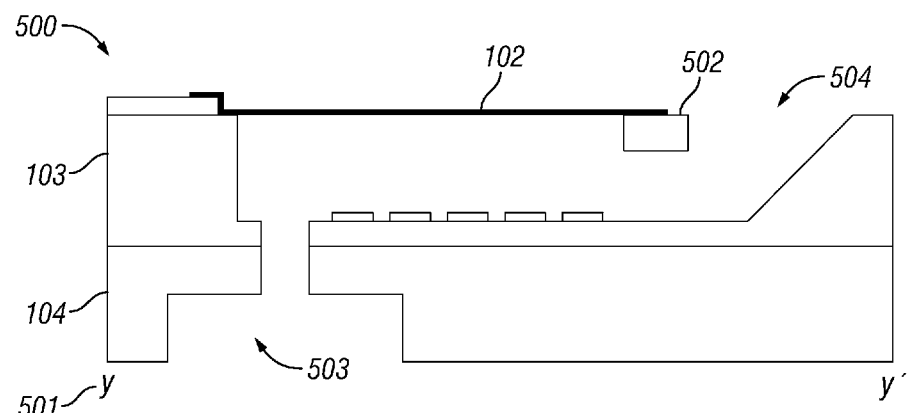
FIG. 5B depicts a cross-sectional view of the graphene-trough pump 500 depicted in FIG. 5A, taken from viewpoint 501 (y to y').
Figure 6A:
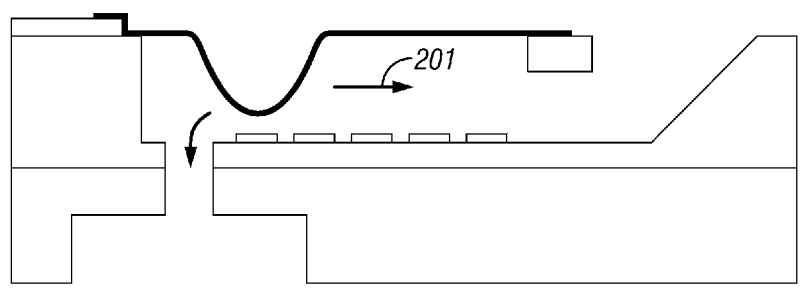
FIGS. 6A-6E depict the cross-sectional view of the graphene-trough pump 500 depicted in FIG. 5B, in which graphene 102 is moved in a traveling wave, with arrows 201 reflecting air (or other gas flow) as the graphene 102 is deflected from section to section.
Figure 6B:
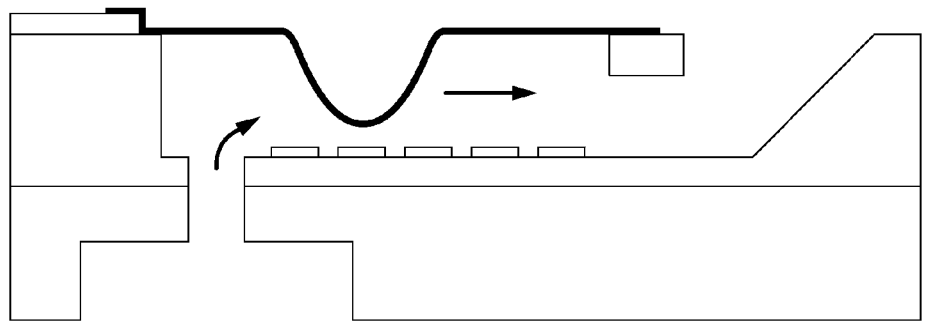
Figure 6C:
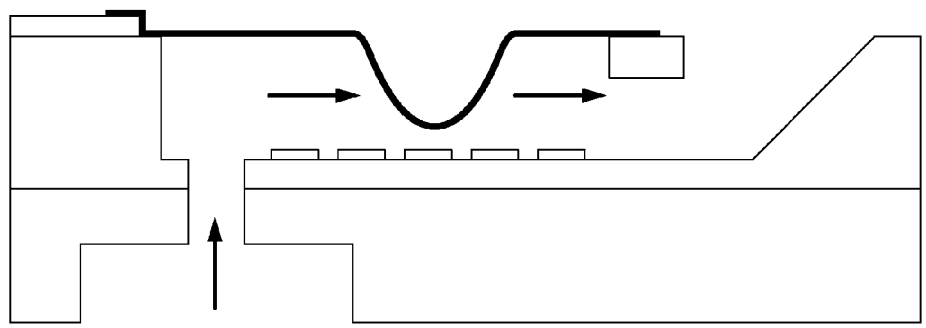
Figure 6D:
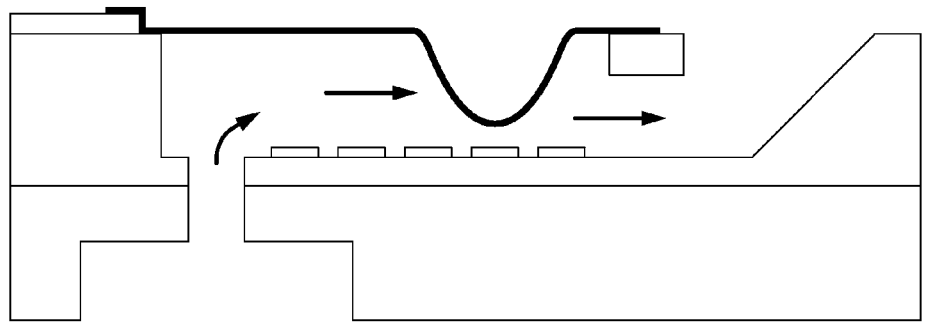
Figure 6E:
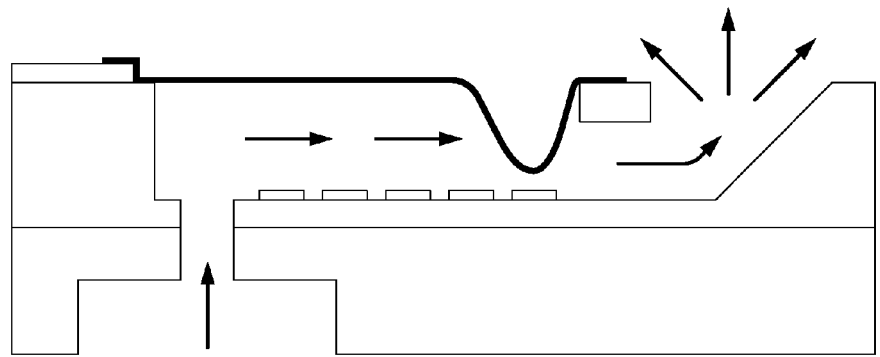

FIG. 5A depicts another graphene-trough pump 500 of the present invention. In this embodiment, a through silicon via (TSV) 503 is used for the inlet while the air is ejected directly through opening 504, which is at the top of the graphene-trough pump 500 (as oriented in this FIG. 5A) (i.e., one of the TSVs depicted in graphene-trough pump 100 shown in FIG. 1A and graphene-trough pump 300 shown in FIG. 3A is eliminated). FIG. 5B depicts a cross-sectional view of the graphene-trough pump 500 depicted in FIG. 5A, taken from viewpoint 501 (y to y'). A bridge 502 (which can be manufactured using known techniques) is used to support the graphene 102 across the trough-shaped channel 107. This design eliminates one TSV and minimizes drag losses the fluid/air may encounter when it is routed out through a TSV.

FIGS. 6A-6E depict the cross-sectional view of the graphene-trough pump 500 depicted in FIG. 5B, in which graphene 102 is moved in a traveling wave, with arrows 201 reflecting air (or other fluid flow) as the graphene 102 is deflected from section to section.

TSV-less Graphene-Trough Pump and System

Figure 7A:
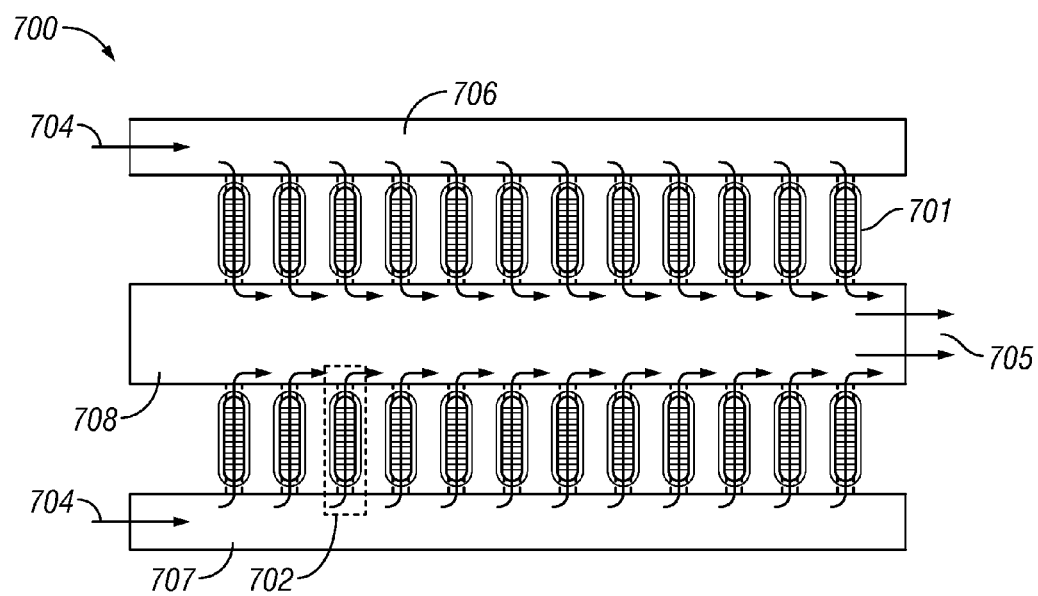
FIG. 7A depicts a graphene-trough pump system 700 of the present invention. In this embodiment, there are a plurality of graphene-trough pumps 701 each of which has no TSVs (i.e., the TSVs depicted in graphene-trough pump 100 shown in FIG. 1A, graphene-trough pump 300 shown in FIG. 3A, and graphene-trough pump 500 shown in FIG. 5A are eliminated).

FIG. 7A depicts a graphene-trough pump system 700 of the present invention. In this embodiment, there are a plurality of graphene-trough pumps 701 each of which has no TSVs (i.e., the TSVs depicted in graphene-trough pump 100 shown in FIG. 1A, graphene-trough pump 300 shown in FIG. 3A, and graphene-trough pump 500 shown in FIG. 5A are eliminated).

Figure 7B:
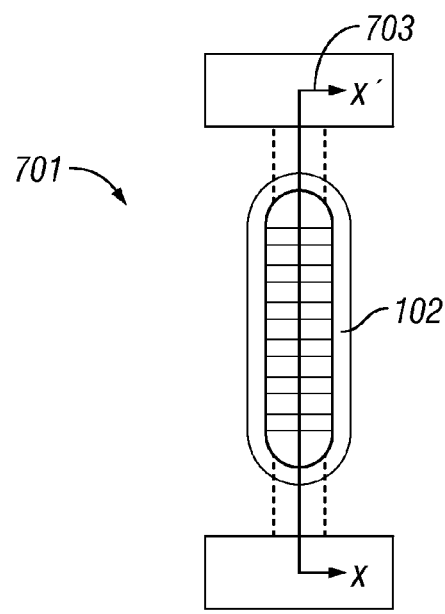
FIG. 7B is a magnified view of box 702 shown in FIG. 7A, which box 702 contains one of the graphene-trough pumps 701.
Figure 7C:
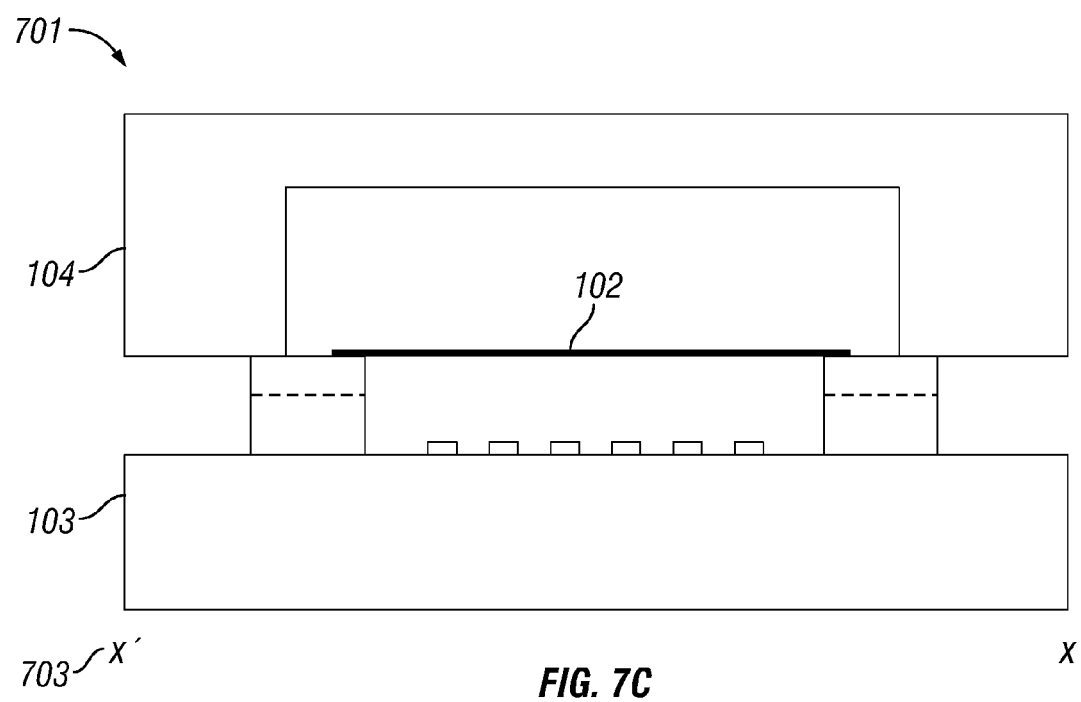
FIG. 7C depicts a cross-sectional view of the graphene-trough pump 701 depicted in FIG. 7B, taken from viewpoint 703 (x to x').

FIG. 7B is a magnified view of box 702 shown in FIG. 7A, which box 702 contains one of the graphene-trough pumps 701. FIG. 7C depicts a cross-sectional view of the graphene-trough pump 701 depicted in FIG. 7B, taken from viewpoint 703 (x to x').

Figure 8A:
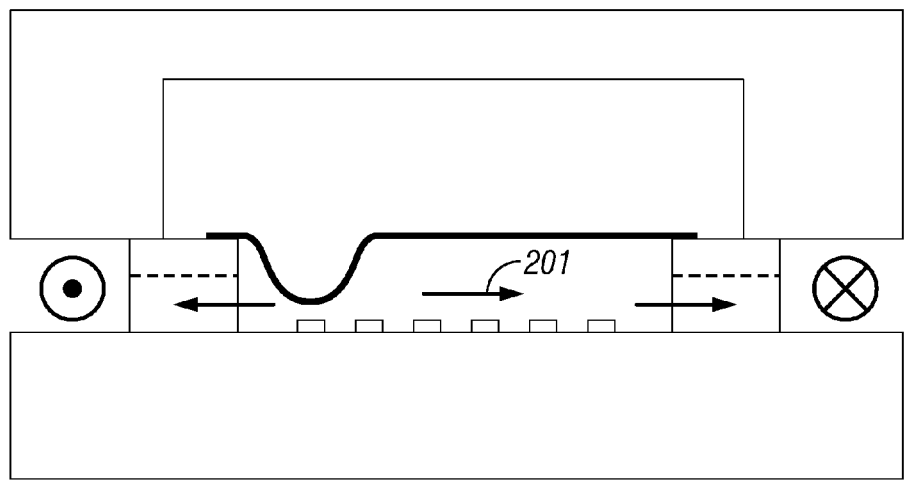
FIGS. 8A-8C depict the cross-sectional view of the graphene-trough pump 701 depicted in FIG. 7C, in which graphene 102 is moved similar in a traveling wave, with arrows 201 reflecting air (or other gas flow) as the graphene 102 is deflected from section to section.
Figure 8B:
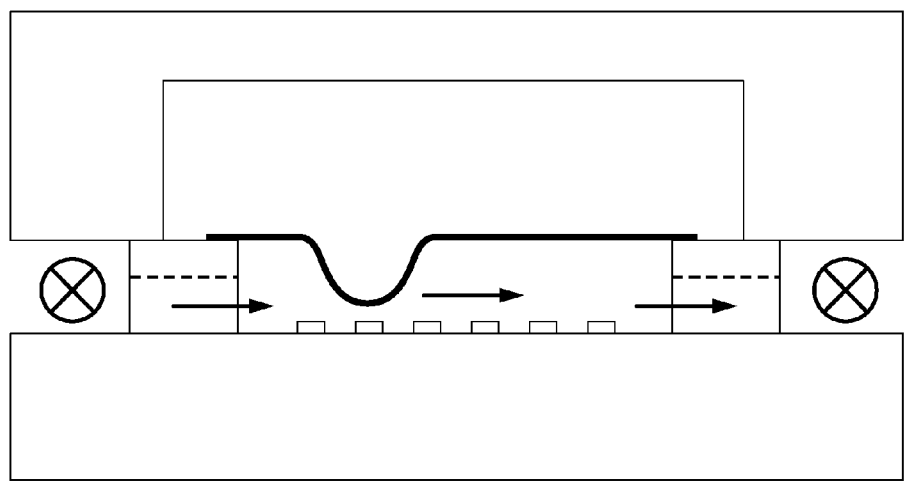
Figure 8C:
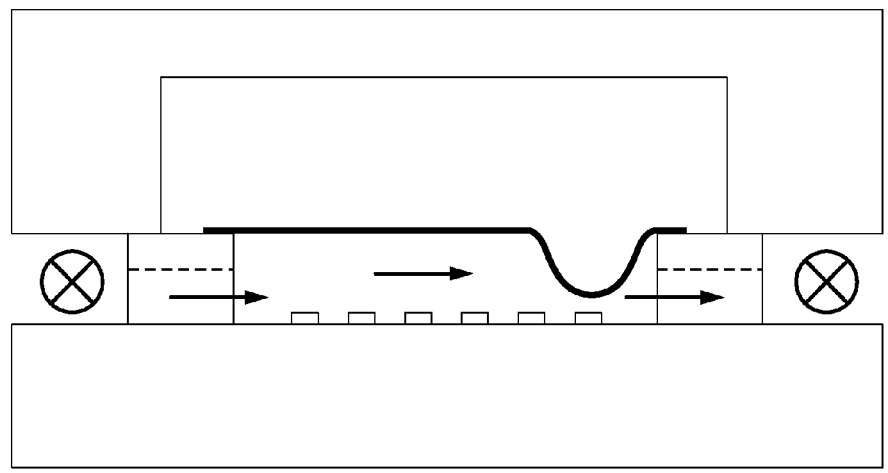

FIGS. 8A-8C depict the cross-sectional view of the graphene-trough pump 701 depicted in FIG. 7C, in which graphene 102 is moved similar in a traveling wave, with arrows 201 reflecting air (or other fluid flow) as the graphene 102 is deflected from section to section.

Air (or fluid gas) is routed in from one side of the chip (side 704) and exits out the opposite side (side 705) using channels 706-708 etched into the top of the chip (as oriented in FIG. 7A). Such a design may be useful, for example, for cooling devices such as LED lights or microchips. In such an instance, the bottom of the graphene-trough pump 700 can be bonded with thermal grease to the device to be cooled. Such graphene-trough pump 700 will generally be lower cost than the embodiments of the present invention including TSVs, because TSVs require a significant amount of etching time/cost.

Valveless Double-Sided Graphene-Trough Pump and System

Figure 9:
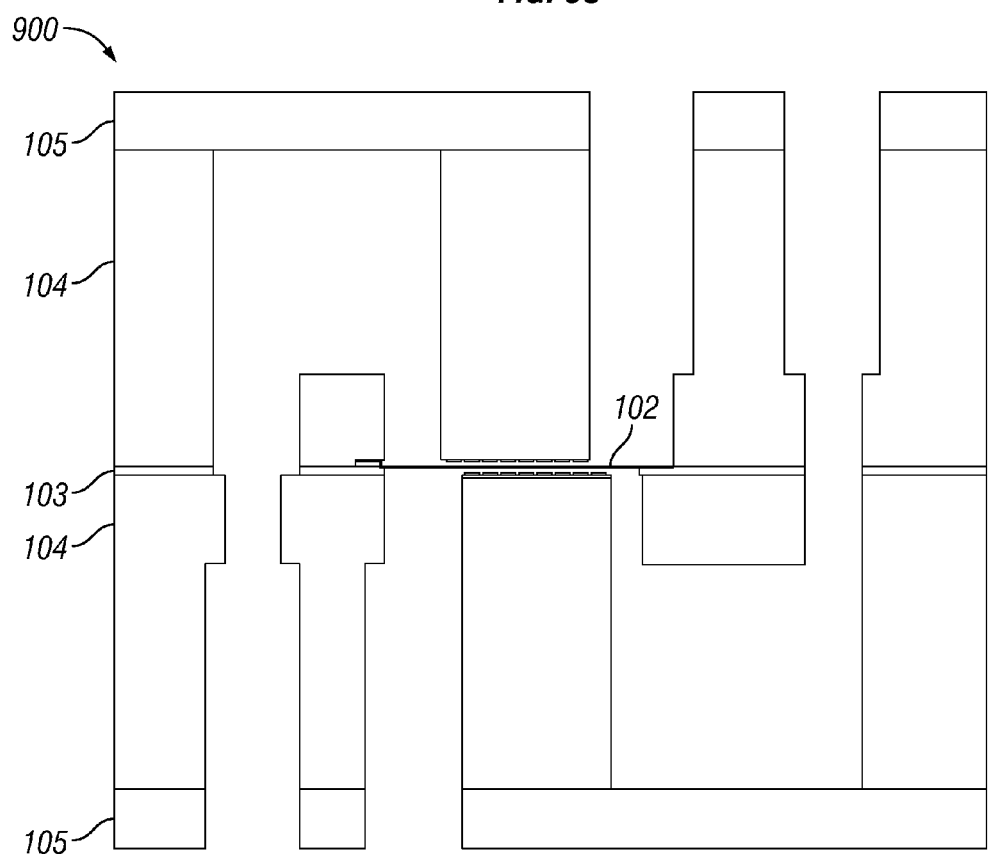
FIG. 9 depicts a cross-sectional view of a double-sided graphene-trough pump 900, which has no explicit valves.

FIG. 9 depicts a cross-sectional view of a double-sided graphene-trough pump 900, which has no explicit valves.

FIGS. 10A-10E depict the cross-sectional view of the graphene-trough pump 900 depicted in FIG. 9, in which graphene 102 is moved in a traveling wave, with arrows 201 reflecting air (or other fluid flow) as the graphene 102 is deflected from section to section.

Figure 10A:
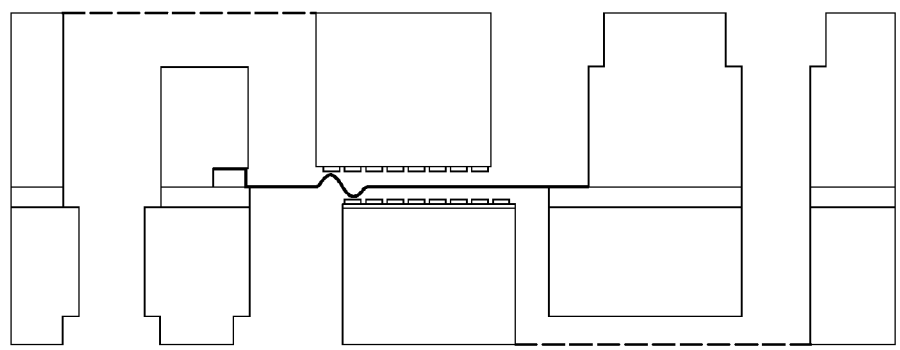
FIGS. 10A-10E depict the cross-sectional view of the graphene-trough pump 900 depicted in FIG. 9, in which graphene 102 is moved in a traveling wave, with arrows 201 reflecting air (or other gas flow) as the graphene 102 is deflected from section to section.
Figure 10B:
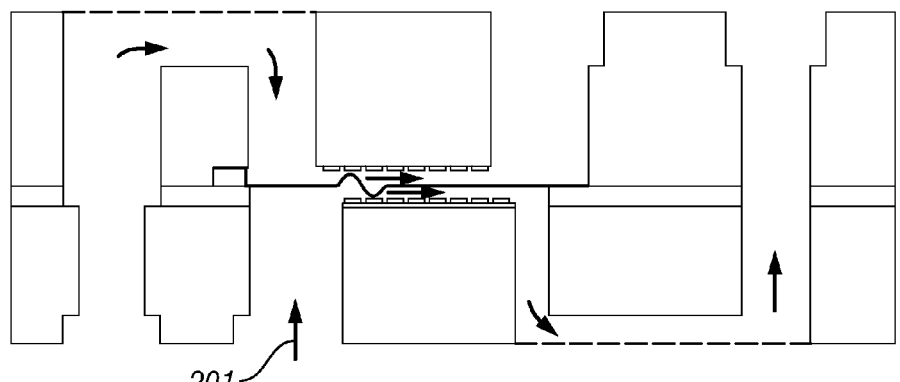
Figure 10C:
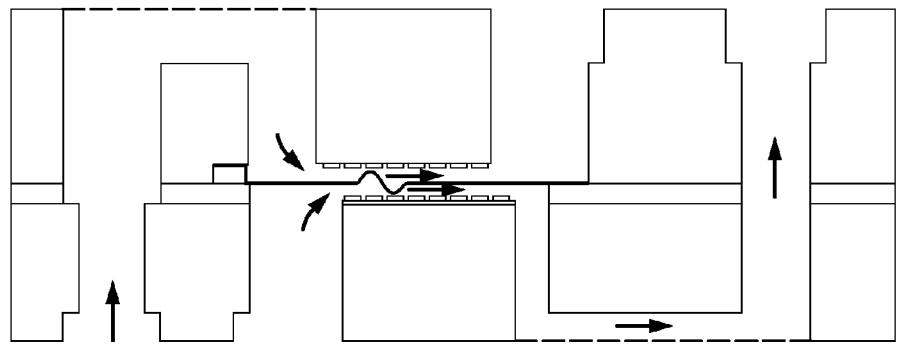
Figure 10D:
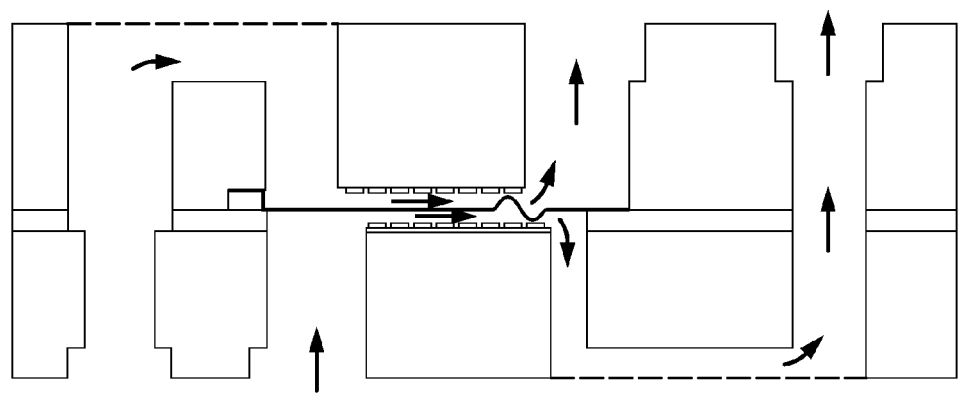
Figure 10E:
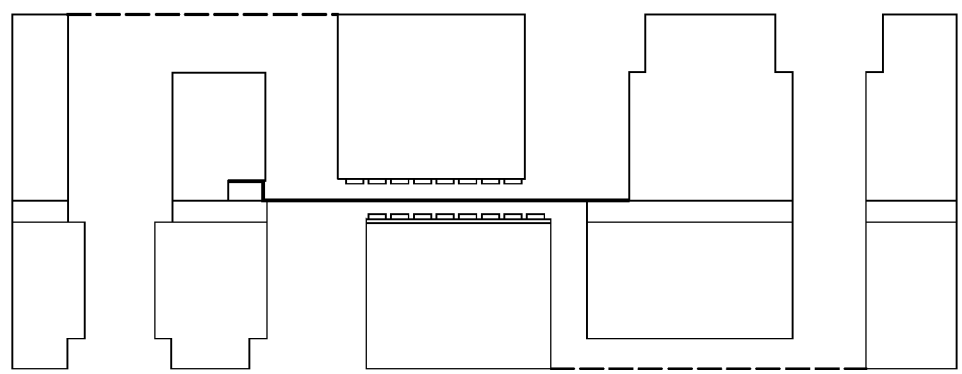
Figure 10F:
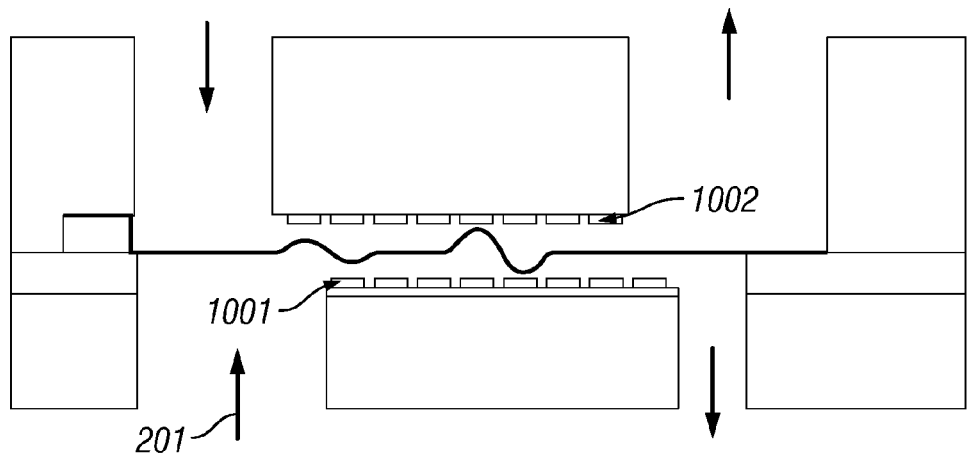
Figure 10G:
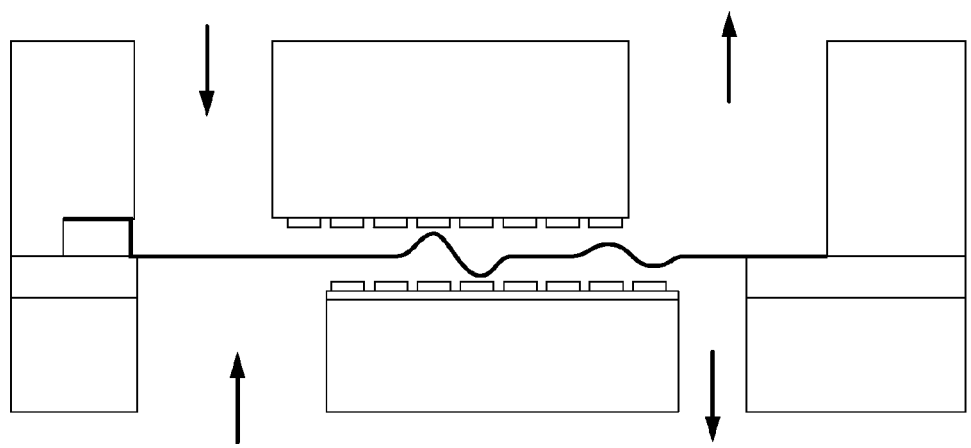

FIGS. 10E-10G depict the cross-sectional view of the graphene-trough pump 900 depicted in FIG. 9 reflecting a constant flow gating method, in which graphene 102 is moved utilizing a pair of traveling waves, with arrows 201 reflecting air (or other fluid flow) as the graphene 102 is deflected from section to section. In this process of deflecting graphene 102, it is possible to maintain a constant flow of air (or other fluid) by using the gate arrays 1001 and 1002 to create a pair of traveling wave graphene deflections. As one traveling wave is growing in amplitude the other is decreasing in amplitude so that the net flow remains constant. By maintaining a constant flow, this will avoid creating any unwanted ultrasonic (on the order of 1 MHz) sound waves that will reflect off the trough walls and cause a loss in efficiency. Constant/smooth airflow should also result in better sound quality when this system is used as a speaker.

Advantages of using a double-sided graphene-trough pump (such as double-sided pump 900) include: higher pumping rate per unit area due to double flow; a reduction of pressure changes within each cavity (since one u-shaped graphene section is being pulled down as another is being pulled up), which reduces back flow and increases pumping speed; the ability to use both restoration force and electrostatic force to rapidly move the graphene 102 (resulting in higher pumping speeds); and the fact that the graphene 102 is protected from the external environment (i.e., graphene 102 cannot be directly touched/damaged).

Valved Double-Sided Graphene-Trough Pump and System

Figure 11:
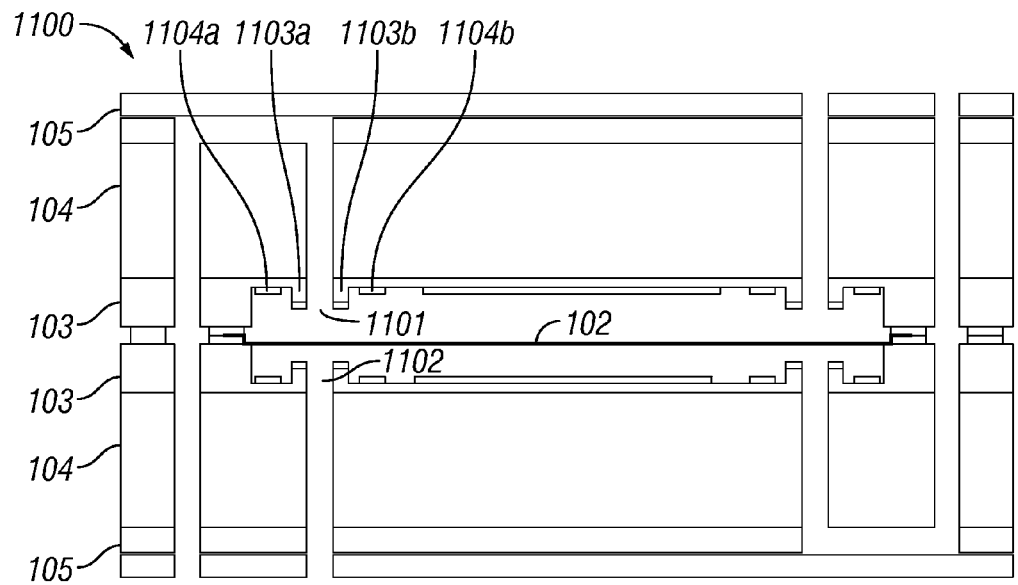
FIG. 11 depicts a cross-sectional view of a double-sided graphene-trough pump 1100, which has explicit valves.
Figure 12A:
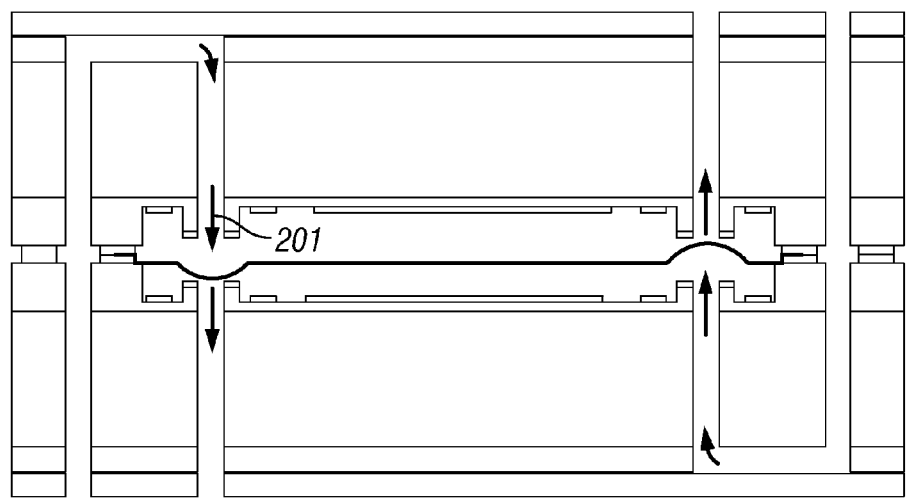
FIGS. 12A-12E depict the cross-sectional view of the graphene-trough pump 1100 depicted in FIG. 11, in which graphene 102 is moved in a traveling wave, with arrows 201 reflecting air (or other gas flow) as the graphene 102 is deflected from section to section.
Figure 12B:
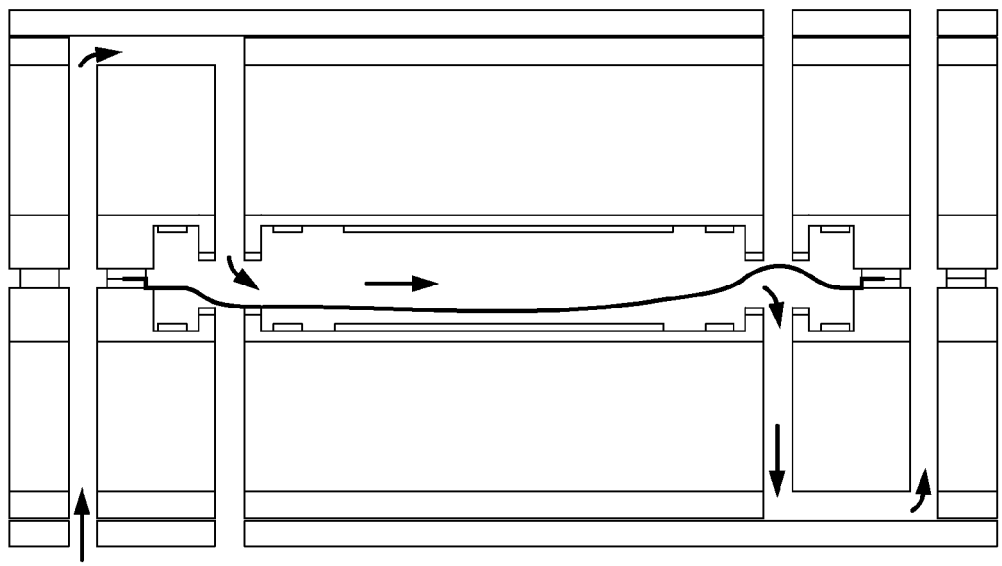
Figure 12C:
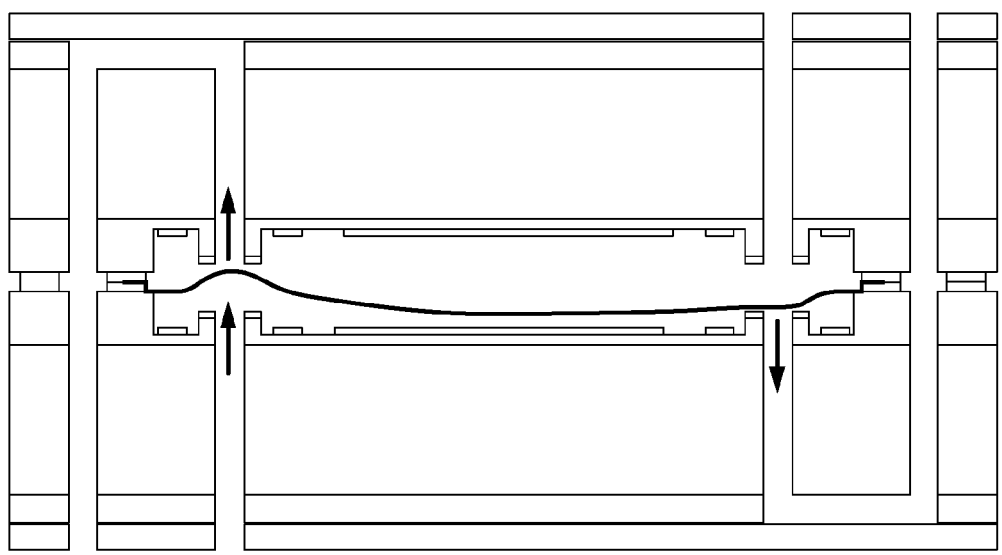
Figure 12D:
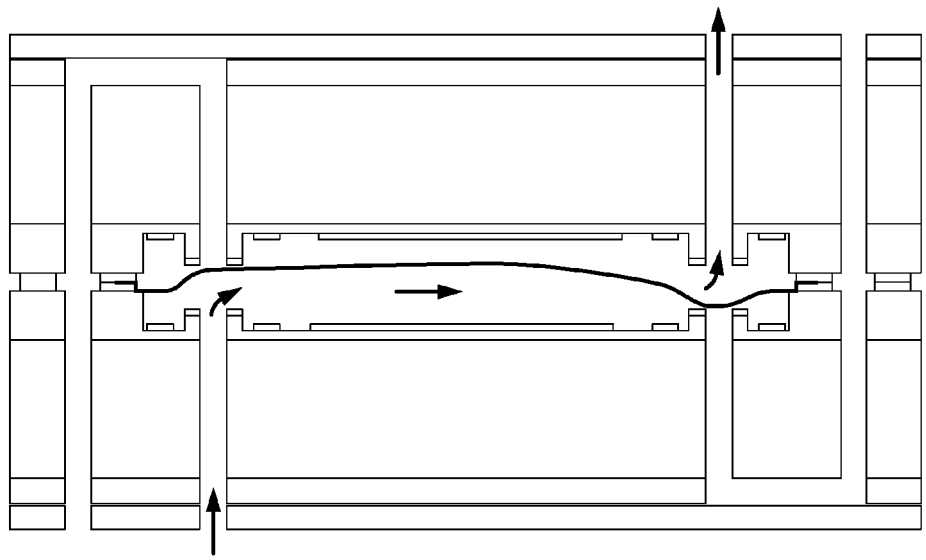
Figure 12E:
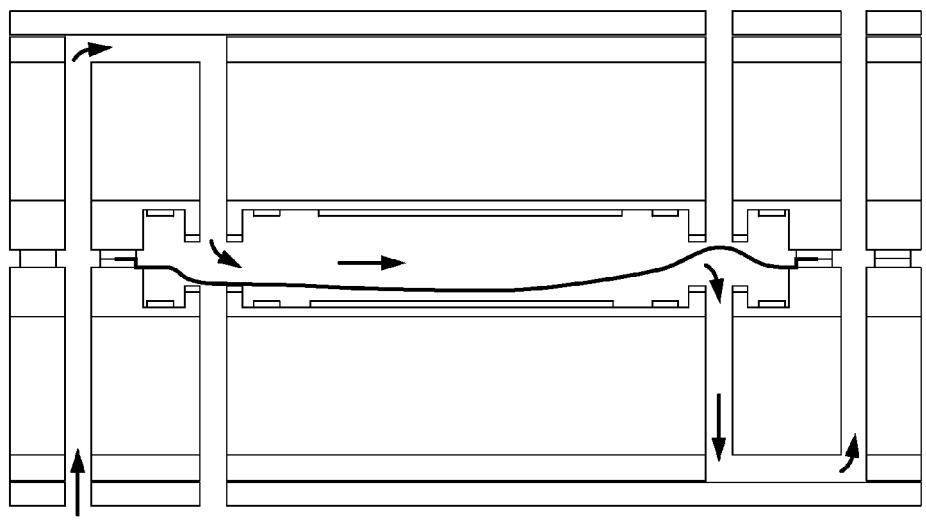

FIG. 11 depicts a cross-sectional view of a double-sided graphene-trough pump 1100, which has explicit valves (such as graphene drum that includes the graphene membrane 102 and gates 1101 and 1102). As depicted in FIG. 11, when the graphene 102 deflects upward to valve/gate 1101, the valve is closed in one direction (while open in the other) and when the graphene 102 deflects downward to valve/gate 1102, the valve is now closed in the other direction (while open in the first direction). Moreover, when the graphene 102 is not deflected in either direction, the valve is open in both directions. The graphene 102 does isolate the air (or other fluid) flow from the other.

Traces (such as traces 1103a or 1103b) are not to be used to actuate the graphene 102 by the valves. Such traces can either be tied to the same voltage as the graphene 102 (most likely to ground) or be used as position sensors (such as a capacitive position sensor). The actual valve gates (such as valve gates 1104a and 1104b) are placed away from the portion of the valve that faces the graphene 102 for the same reason as discussed above for FIG. 1B (i.e., to prevent the graphene from entering a runaway condition).

FIGS. 12A-12E depict the cross-sectional view of the graphene-trough pump 1100 depicted in FIG. 11, in which graphene 102 is moved in a traveling wave, with arrows 201 reflecting air (or other fluid flow) as the graphene 102 is deflected from section to section.

Double-sided graphene-trough pump 1100 has all of the advantages discussed above associated with such double-sided design. In addition, double-sided graphene-trough pump 1100 can achieve high compression or vacuum levels due to its valves. As shown in FIG. 11, each valve has a metal gate (such as gates 1101 and 1102) facing the graphene 102 that can be used to sense the position of the graphene 102 relative to the valve gate (using current feedback, changes in capacitance, etc.). The gates (currently not labeled) on either side of gates 1101 and 1102 can optionally actuate the valves. Optionally, a CMOS layer in the silicon substrate can be used to help actively control each graphene-valve individually using position feedback.

Secondary Flow Graphene-Trough Pump and System

Figure 13B:
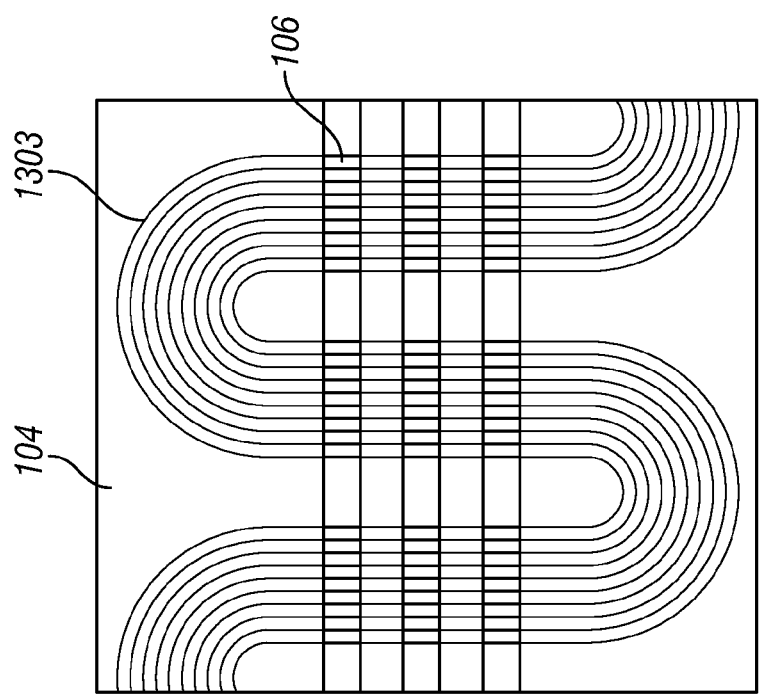
FIG. 13B depicts a second portion 1302 of a graphene-trough pump system that includes the oxide 104 and gates 106 (with the gate array 1303 arranged in a serpentine manner).
Figure 13A:
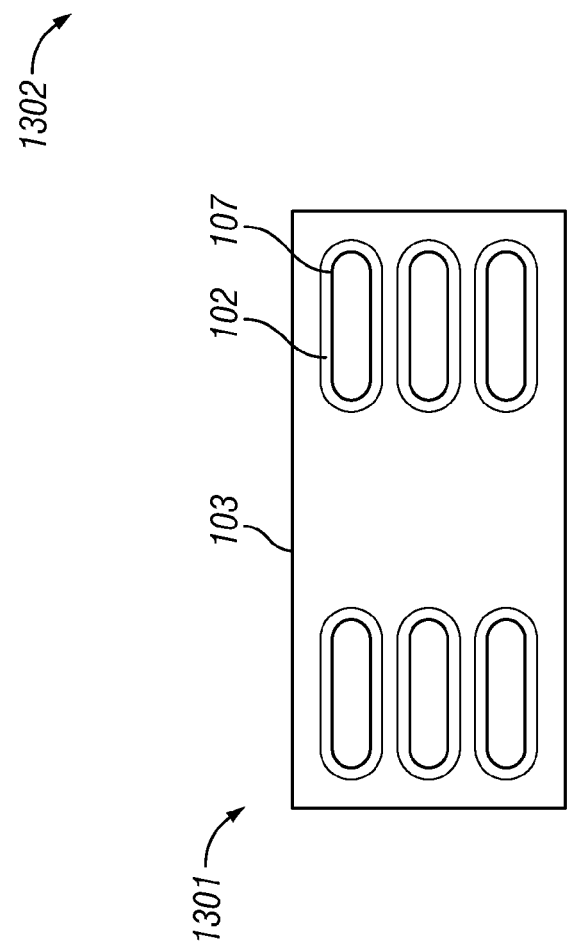
FIG. 13A depicts a first portion 1301 of a graphene-trough pump system that includes the silicon 103 having troughs 107 and corresponding graphene 102.

FIG. 13A depicts a first portion 1301 of a graphene-trough pump system that includes the silicon 103 having troughs 107 and corresponding graphene 102. This first portion 1301 can also be referred to as the "chip portion" of the graphene-trough pump system.

FIG. 13B depicts a second portion 1302 of a graphene-trough pump system that includes the oxide 104 and gates 106 (with the gate array 1303 arranged in a serpentine manner). This second portion 1302 can be referred to as the "gate portion" of the graphene-trough pump system.

This serpentine gate structure can be used so that many graphene-trough pumps can utilize a reasonable number of gate channels (five channels are shown in FIG. 13B). While not directly shown in the figures for the graphene-trough pumps described and discussed above, the serpentine gate structure was generally used to form the gate sections.

Figure 14:
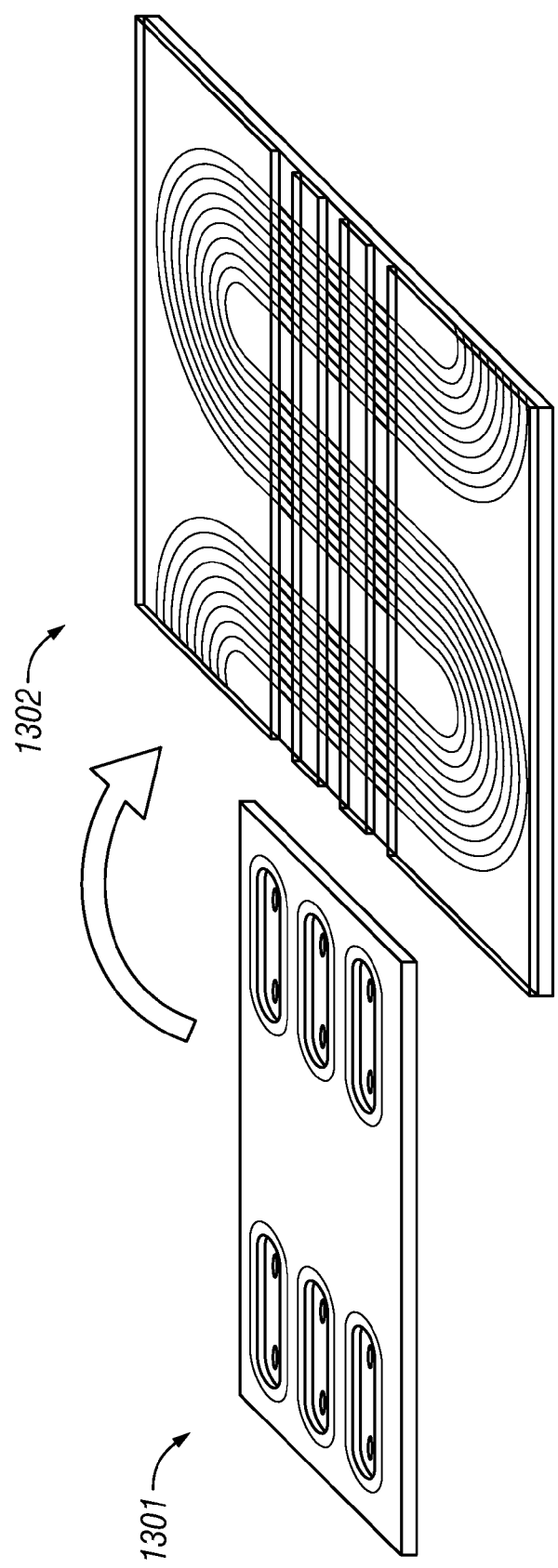
FIG. 14 depicts the joining of first portion 1301 with second portion 1302 to form graphene-trough-pump system 1500 (depicted in FIG. 15).
Figure 15:
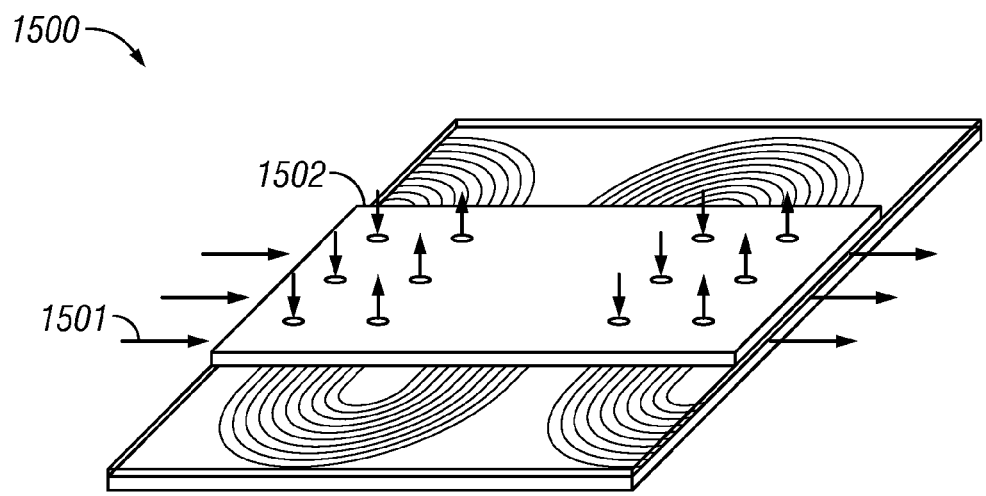
FIG. 15 depicts graphene-trough pump system 1500. Arrows 1501 reflect the primary flow of air (or other gas) in the graphene-trough pump system 1500. Arrows 1502 reflect the secondary flow of air (or other gas) in the graphene-trough pump system 1500 (typically for cooling flow).

FIG. 14 depicts the joining of first portion 1301 with second portion 1302 to form graphene-trough-pump system 1500 (depicted in FIG. 15).

FIG. 15 depicts graphene-trough pump system 1500. Arrows 1501 reflect the primary flow of air (or other fluid) in the graphene-trough pump system 1500. Arrows 1502 reflect the secondary flow of air (or other fluid) in the graphene-trough pump system 1500 (typically for cooling flow). If the troughs 107 of the first portion 1301 were completely sealed, the first portion would likely heat up over time to unacceptable temperatures (which could damage the device).

Figure 16:
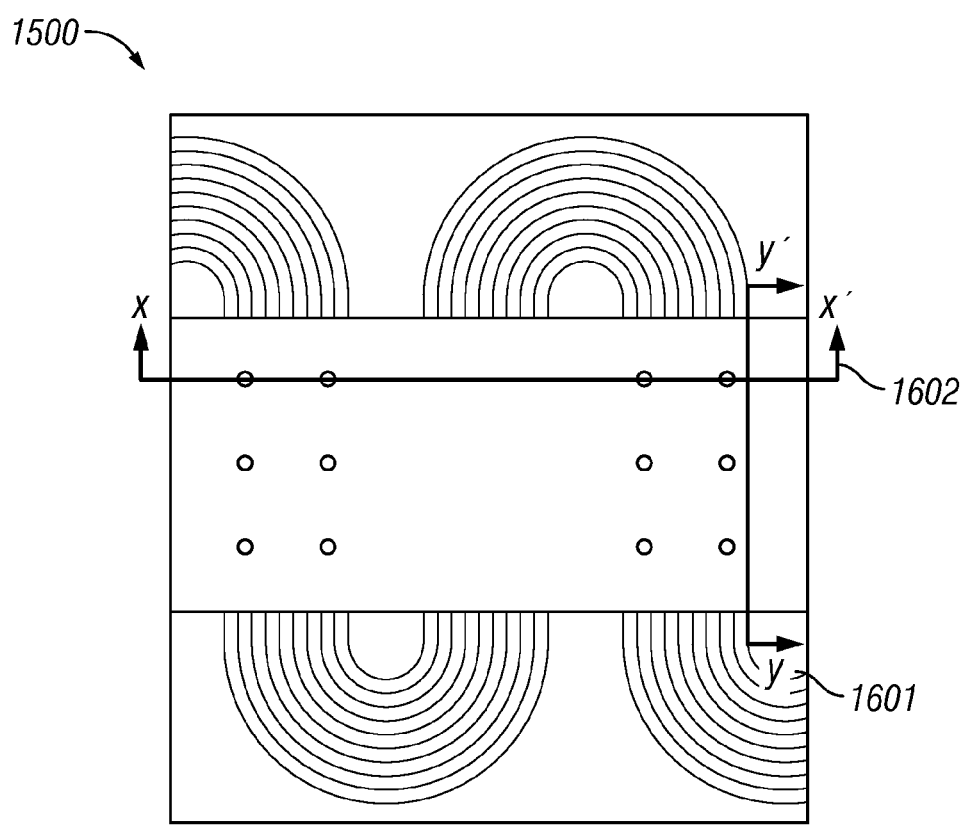
FIG. 16 depicts an overhead view of graphene-trough pump system 1500.

FIG. 16 depicts an overhead view of graphene-trough pump system 1500.

Figure 17:
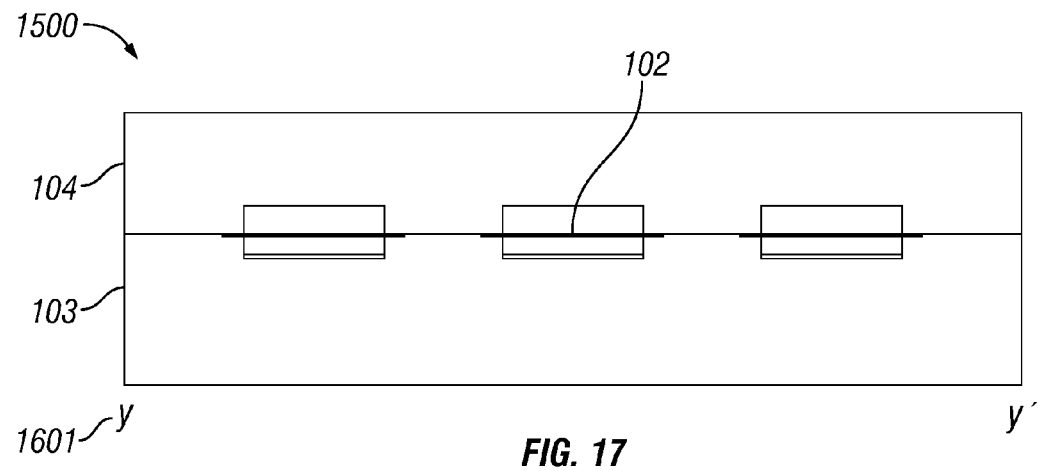
FIG. 17 depicts a cross-sectional view of the graphene-trough pump system 1500 depicted in FIG. 16, taken from viewpoint 1601 (y to y').
Figure 18:
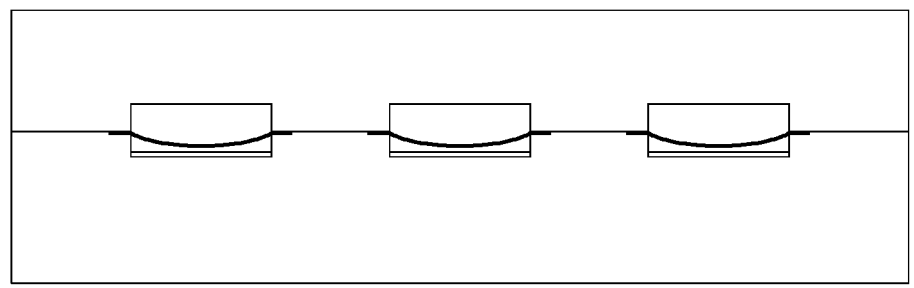
FIG. 18 depicts the cross-sectional view of the graphene-trough pump 1500 depicted in FIG. 17, in which graphene 102 is deflected (which is a traveling wave traveling perpendicular to this cross sectional view.

FIG. 17 depicts a cross-sectional view of the graphene-trough pump system 1500 depicted in FIG. 16, taken from viewpoint 1601 (y to y'). FIG. 18 depicts the cross-sectional view of the graphene-trough pump 1500 depicted in FIG. 17, in which graphene 102 is deflected to produce a traveling wave that moves air (or other fluid) perpendicular to this cross sectional view.

Figure 19A:
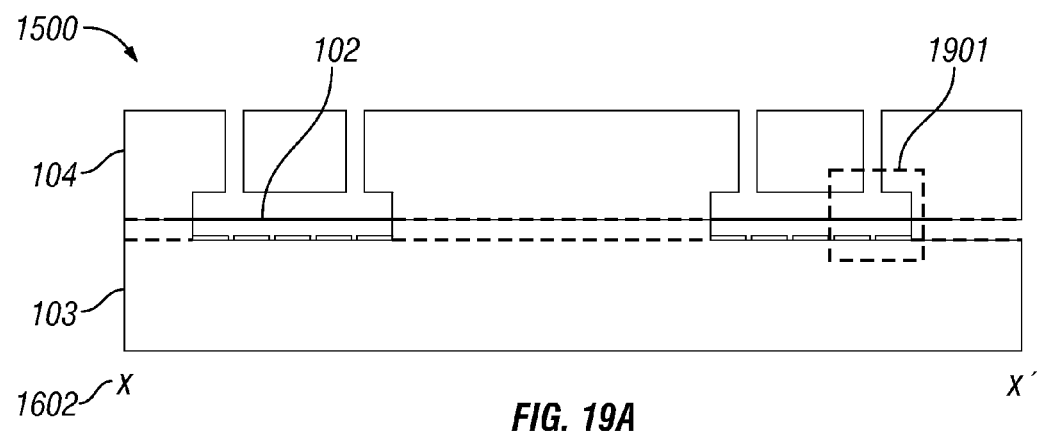
FIG. 19A depicts a cross-sectional view of the graphene-trough pump system 1500 depicted in FIG. 16, taken from viewpoint 1602 (x to x').
Figure 19B:
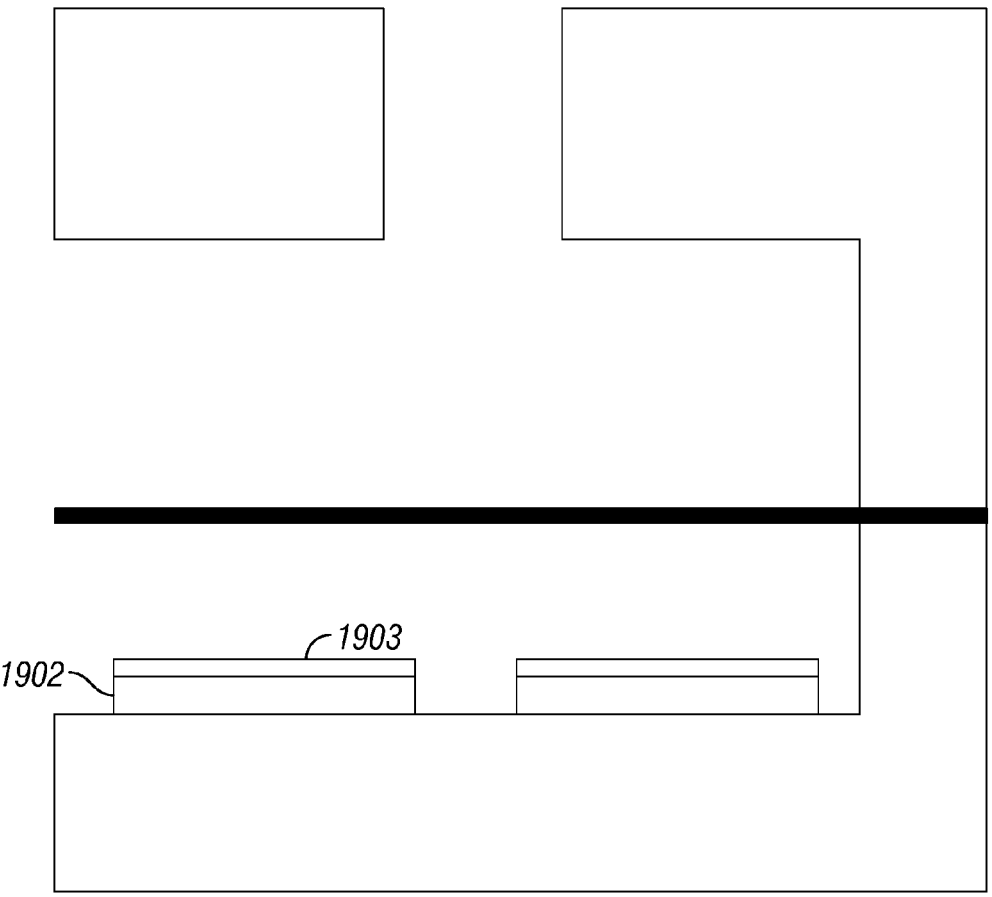
FIG. 19B is a magnified view of box 1901 shown in FIG. 19A, which box 1901 contains a graphene-trough pump in the graphene-trough pump system.
Figure 20A:
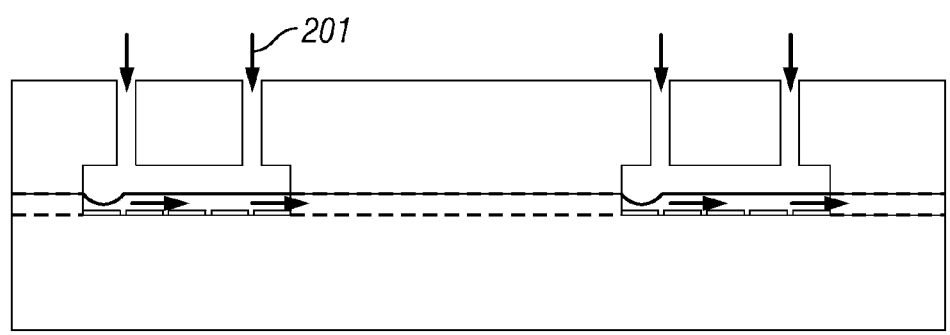
FIGS. 20A-20E depict the cross-sectional view of the graphene-trough pump 1500 depicted in FIG. 19A, in which graphene 102 is moved in a traveling wave, with arrows 201 reflecting air (or other gas flow) as the graphene 102 is deflected from section to section.
Figure 20B:
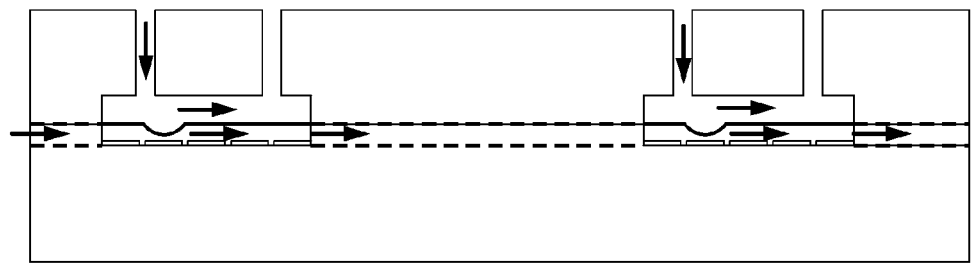
Figure 20C:
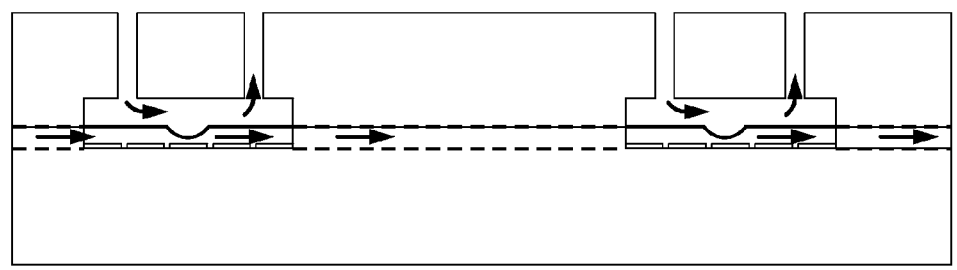
Figure 20D:
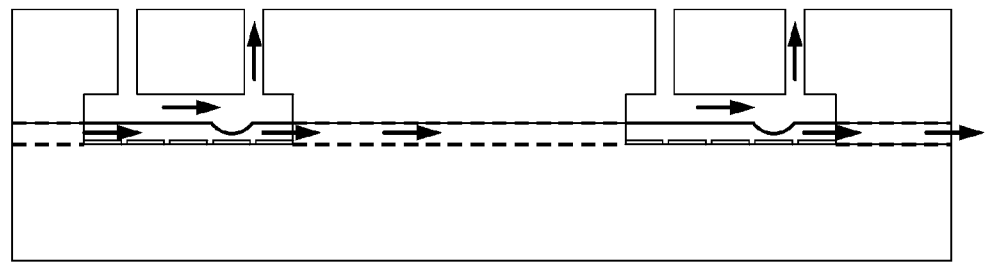
Figure 20E:
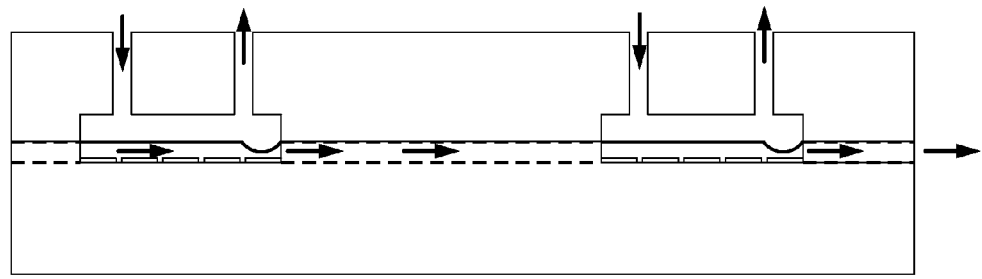

FIG. 19A depicts a cross-sectional view of the graphene-trough pump system 1500 depicted in FIG. 16, taken from viewpoint 1602 (x to x'). FIG. 19B is a magnified view of box 1901 shown in FIG. 19A, which box 1901 contains a graphene-trough pump in the graphene-trough pump system. FIGS. 20A-20E depict the cross-sectional view of the graphene-trough pump 1500 depicted in FIG. 19A, in which graphene 102 is moved in a traveling wave, with arrows 201 reflecting air (or other fluid flow) as the graphene 102 is deflected from section to section.

FIG. 19B shows a thin layer of oxide on each gate (such as oxide 1903 on gate 1902). This oxide is used to prevent the graphene 102 from shorting out the gate in the event the graphene is torn or damaged for any reason. It has been found that that there typically will be a few damaged graphene-trough pumps systems in a large array (hundreds to thousands) of graphene-trough pump systems and a single piece of damaged graphene can short out an entire array unless the gates have an insulator (such as oxide) on their surface to prevent current flow.

Another benefit of graphene-trough pump system 1500 is that the graphene 102 can be transferred to the top portion 1301, which does not have the main airflow channels or gates. While not shown in figures, the top portion can optionally have a layer of metal and oxide (graphene on top of metal; metal on top of oxide; oxide on top of silicon) that can be used to pull (using a voltage between the silicon and graphene) any damaged graphene into the top cavity. Using this design, damaged graphene is much less likely to block the main airflow channel or contact the gates.

Chip-Stacked Graphene-Trough Pump and System

Figure 21:
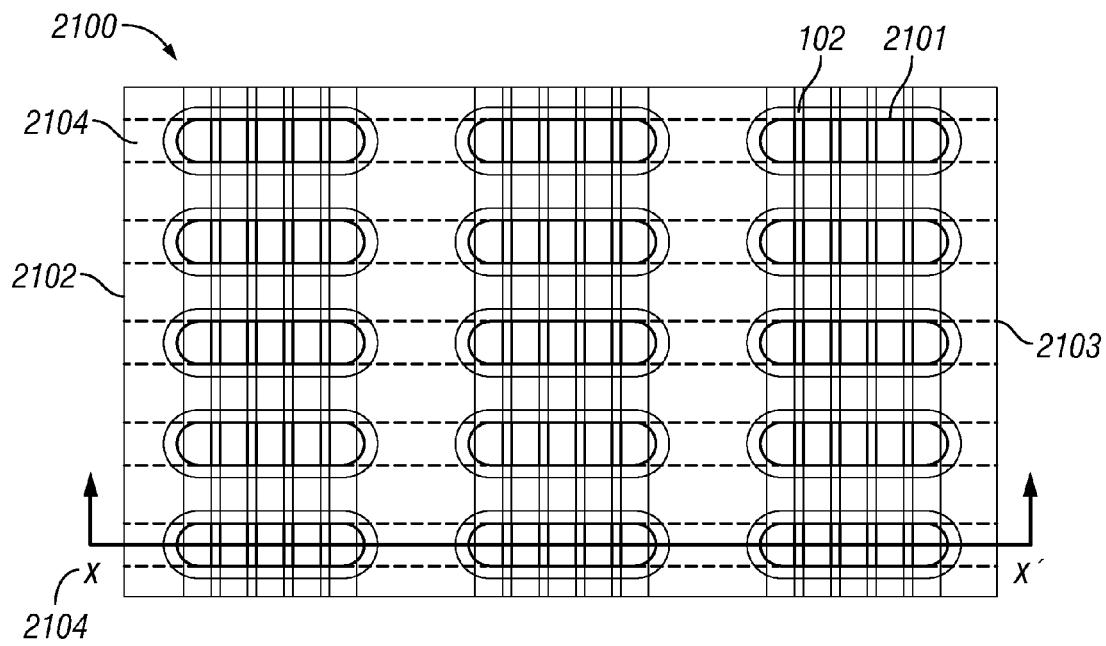
FIG. 21 depicts a graphene-trough pump system 2100 of the present invention in which the graphene-trough pumps 2101 pump the air (or other gas) from one side of the chip to the other (such as from side 2102 to side 2103 of the chip).

FIG. 21 depicts a graphene-trough pump system 2100 of the present invention in which the graphene-trough pumps 2101 pump the air (or other fluid) from one side of the chip to the other (such as from side 2102 to side 2103 of the chip). The dotted lines show the channels 2104 beneath the surface that can support the graphene 102.

Figure 22:
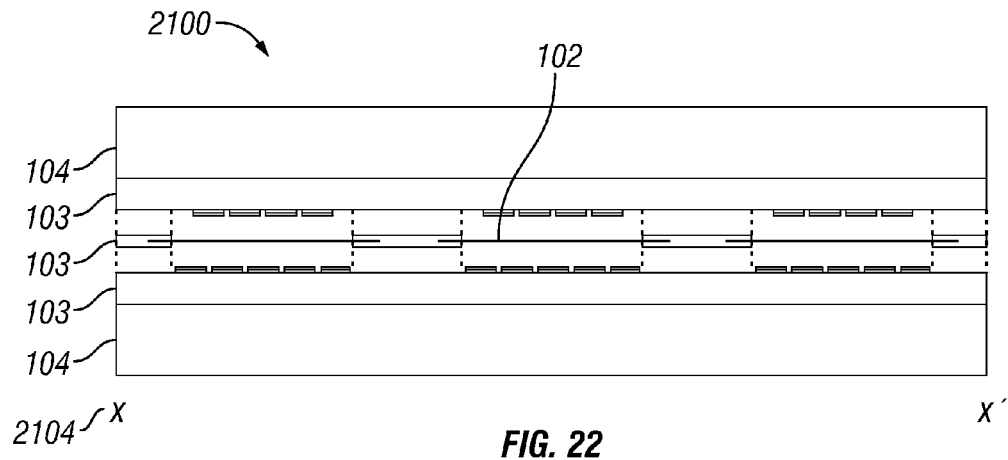
FIG. 22 depicts a cross-sectional view of the graphene-trough pump system 2100 depicted in FIG. 21, taken from viewpoint 2104 (x to x').
Figure 23A:
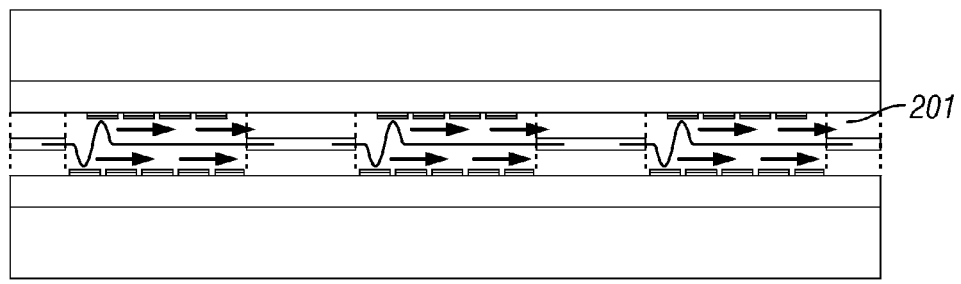
FIGS. 23A-23D depict the cross-sectional view of the graphene-trough pump 2100 depicted in FIG. 22, in which graphene 102 is moved in a traveling wave, with arrows 201 reflecting air (or other gas flow) as the graphene 102 is deflected from section to section.
Figure 23B:
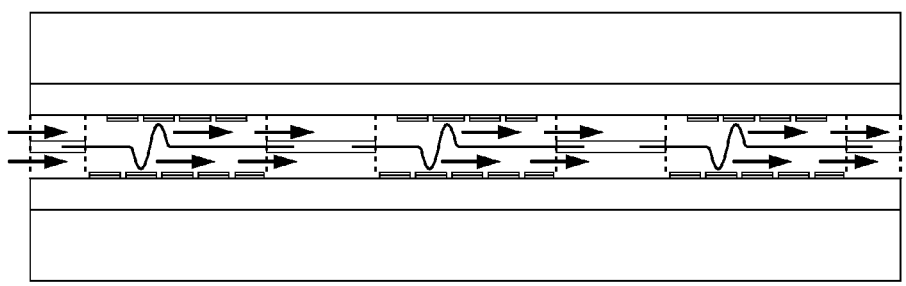
Figure 23C:
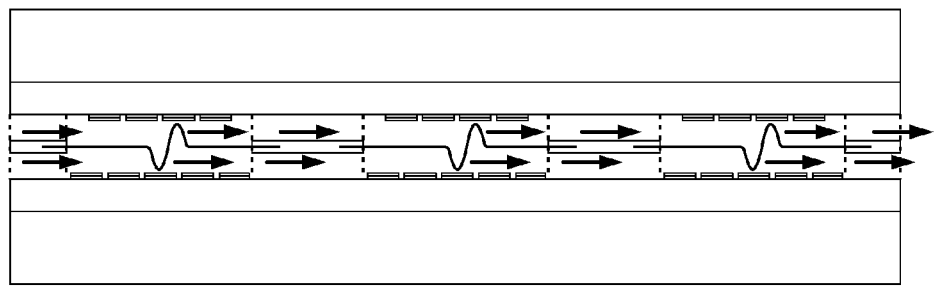
Figure 23D:
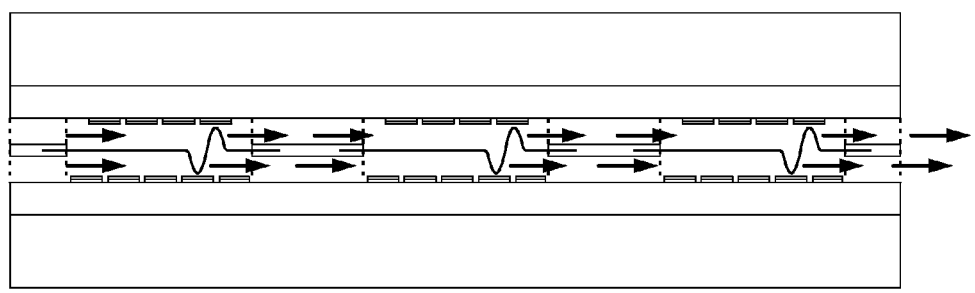

FIG. 22 depicts a cross-sectional view of the graphene-trough pump system 2100 depicted in FIG. 21, taken from viewpoint 2104 (x to x'). As shown in FIG. 22, two silicon chips 104 are sandwiched together. Thus, for this embodiment, the two single layers of graphene 102 become a double layer of graphene. The advantages of having both an upper and lower gate array of graphene-trough pump systems is discussed above.

FIGS. 23A-23D depict the cross-sectional view of the graphene-trough pump 2100 depicted in FIG. 22, in which graphene 102 is moved in a traveling wave, with arrows 201 reflecting air (or other fluid flow) as the graphene 102 is deflected from section to section.

Stacked Graphene-Trough Pump and System

Figure 24:
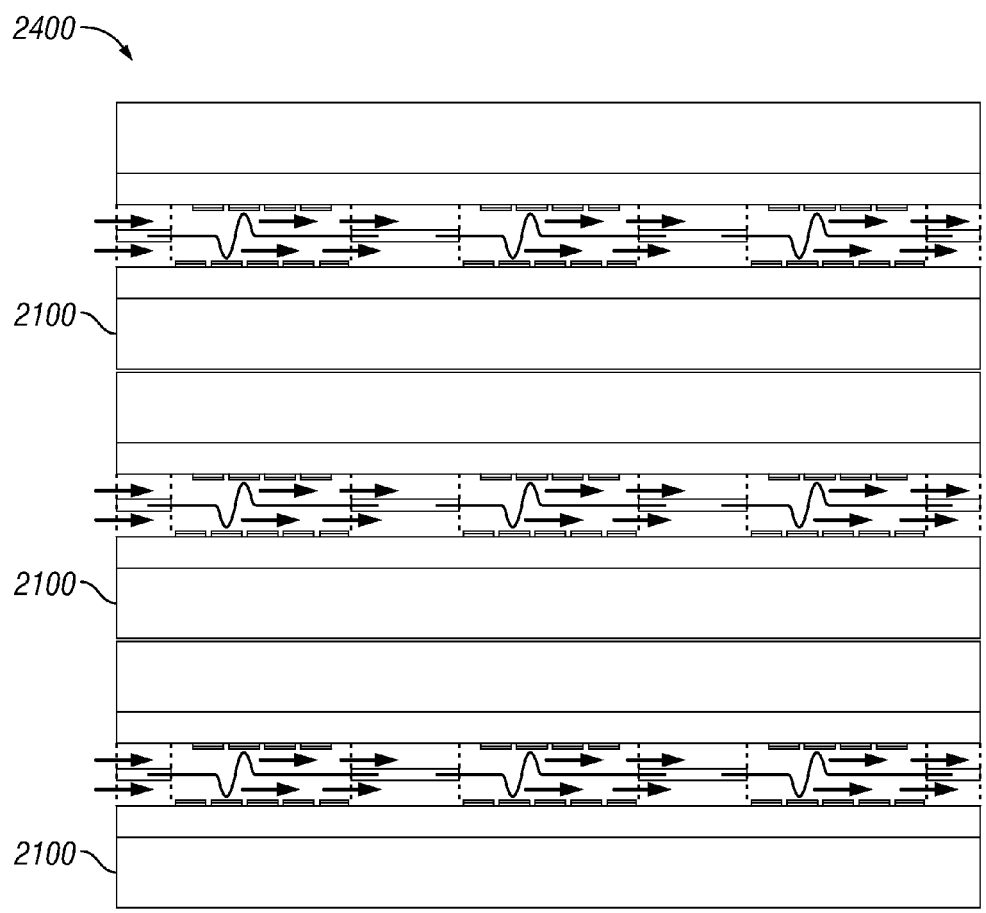
FIG. 24 depicts a cross-sectional view of a graphene-trough pump system 2400 made up of a stack of graphene-trough pump systems 2100 depicted in FIG. 22.

FIG. 24 depicts a cross-sectional view of a graphene-trough pump system 2400 made up of a stack of graphene-trough pump systems 2100 depicted in FIG. 22.

Stacking the graphene-trough pumps, such as shown in FIG. 24, is advantageous because this will increase pumping speed, thereby, for example, increasing audio output if operated as a speaker. A typical silicon wafer is about 500 microns thick. Using methods well known in the art, it is possible to etch out just the active top portion of a device (i.e., the elements of the graphene-trough pump array of the present invention). The thickness of each pump array can be reduced from around 500 microns to approximately 10 microns. This approach can increase the pumping rate for a given volume/mass by approximately 50 times. This is quite beneficial. For instance, in the case where the pumps are being used for propulsion, the thrust-to-weight ratio of the device (which is already very high) can be increased by around 50 times using this thin chip approach.

Devices

A number of devices can be made utilizing graphene-trough pumps (and systems), such as audio speakers, mobile audio speakers, vacuum pumps, cooling fans, propulsion systems, gas pumps, liquid pumps, mobile lighting systems, robotic systems, ultrasonic imaging devices, ultrasonic payment systems, ultrasonic communication devices, ultrasonic positioning systems, mobile solar cells systems, mobile surveillance systems, mobile radio repeater stations, mobile battery recharging systems, mobile delivery systems, etc. Representative of these devices are the portable device (i.e., music player, phone, etc.), flying device, and solar energy device discussed and described below. Using similar techniques, the graphene-trough pumps (and systems) can likewise be incorporated into other devices, including those set forth above.

Portable Device

Figure 25:
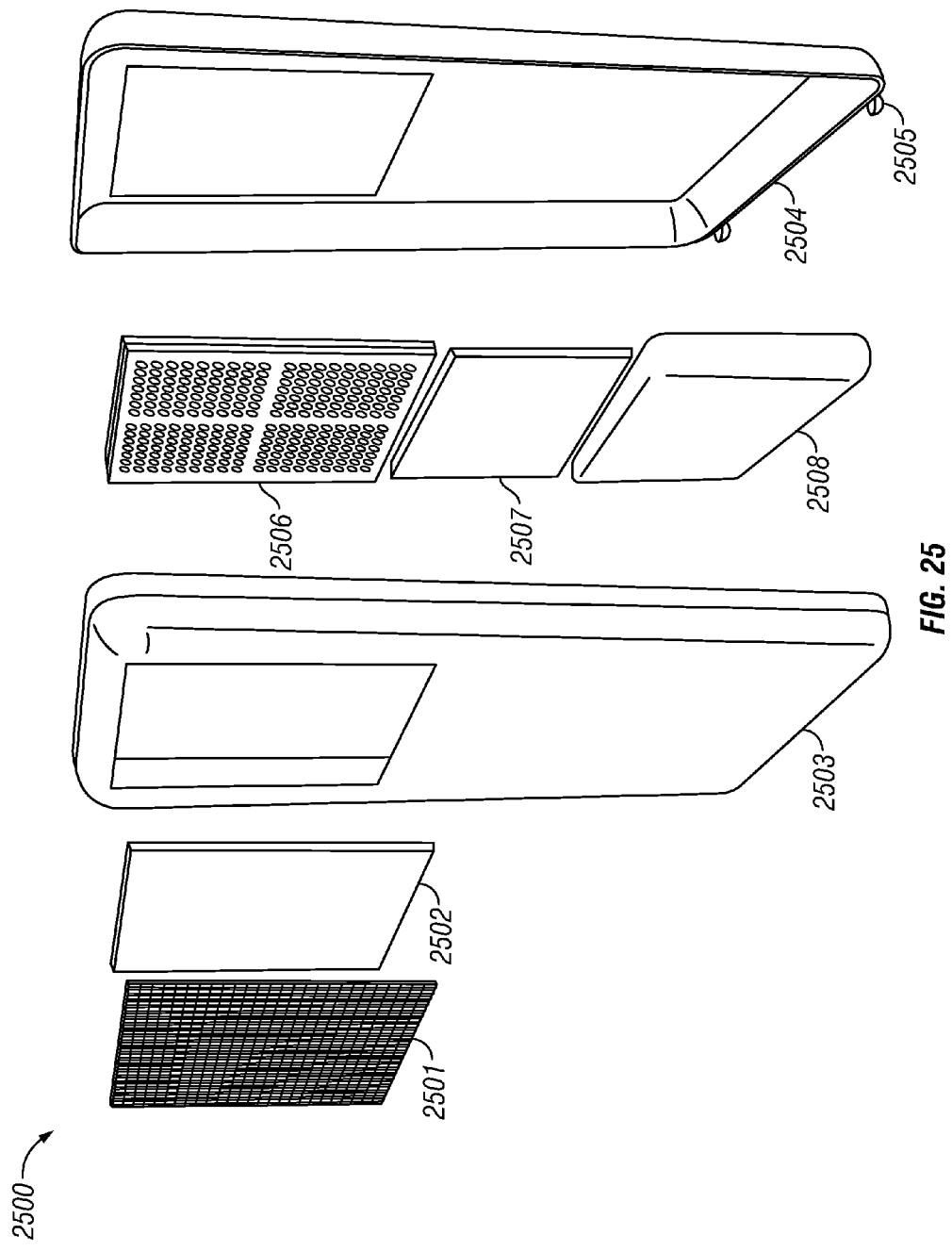
FIG. 25 depicts an exploded view of a portable device (PD) 2500 of the present invention that includes a graphene-trough pump system 2506.

FIG. 25 depicts an exploded view of a portable device 2500 of the present invention that includes a graphene-trough pump system 2506. Such a portable device can be a music player, phone, etc. Filters 2501 and 2502 (which can be combined into one filter if desired) can be utilized. Filter 2501 is to keep moisture out of the pump inlet, and filter 2502 is to keep dust particles from reaching the delicate graphene in the portable device 2500. Optionally, it may be necessary to operate the graphene-trough pump systems in one direction so that the inlet air always passes through at least a filter such as filters 2501 and 2502.

Portable device 2500 also includes a battery 2508 and electronics system 2507 that are electrically connected to each other and to the graphene-trough pump system 2506. The electronics system 2507 generally includes the drive electronics for the graphene-trough pumps (in the graphene-trough pump system 2506) and an element that converts incoming audio or other files into a gating pattern that will best reproduce the desired sound or other effect.

For example, a digital audio signal can be processed by adjusting the graphene-trough pump system controls such that the sound power represented by the audio signal is directly produced by the graphene-trough pump system. A digital audio signal is a stream of discretely sampled signal levels updated at a certain rate (e.g., 16-bit Pulse Code Modulation @ 44.1 KHz).

During each sample interval, the air pressure produced by the graphene-trough pump is adjusted to match the signal level represented by the data stream. Multiple pump control parameters can be adjusted to produce the desired pressure change during each data interval, partly because the cycling rate of the graphene-trough pumps are higher than the update rate of the audio stream. These parameters include the pump cycling rate, the amount of deflection of the graphene (or other atomically thin electrically conductive material), the inclusion or omission of a fraction of the pump cycles during each sample interval, and the inclusion or omission of a fraction of the graphene-trough pumps in an array of pumps during each sample interval. A digital signal processing (DSP) algorithm (known by those of ordinary skill in the art) can make a weighted adjustment of one or more of the pump control parameters according to the discrete sample levels represented in the data stream.

Because adjustment of any of the pump control parameters may produce a non-linear change in the air pressure level, the DSP algorithm can also make corrections to linearize the final sound pressure response in both the time and frequency domains. Furthermore and in addition, the collective set of pump control parameters can be increased or reduced by the DSP algorithm to produce a continuous volume level adjustment according to a desired volume setting. There may also be a means by which the listener can input settings to the DSP algorithm to alter the final result to their personal taste (e.g., bass, treble boost, etc.).

In addition, the electronics system 2507 may include Bluetooth or other communications systems that can wirelessly connect to phones, TVs, etc. Optionally the electronics system 2507 may include motion sensors (such as accelerometers, etc.) that can be used in conjunction with the graphene-trough pump system 2506 to cause the portable device 2500 to move or balance at a desired angle. The graphene-trough pump system 2506 can also rapidly reorient the portable device 2500 to minimize damage, for example, forcing it to impact one or more of the rubber feet 2505 of the case (including front portion 2503 and back portion 2504) if the portable device 2500 is dropped.

The graphene-trough pump system 2506 can also be used to produce and receive ultrasonic signals that can be used for a variety of applications (medical imaging, mobile payments, data transfer, etc.). Sound waves push (or pull) the graphene toward (or away) from the gate array, causing changes in capacitance that can be used to sense both audio and ultrasonic signals.

The embodiment of the graphene-trough pump system 2506 in FIG. 25 is shown to be made from opaque material (such as silicon). Alternatively, graphene-trough pump system 2506 can be made out of transparent material (such as glass) and the electrically conductive gate traces can be made out of transparent electrically conductive material (such as indium-tin-oxide or graphene) in portable device 2500 (or in any of the graphene-trough pump systems described herein). The entire transparent assembly (of graphene-trough pump system 2506) can overlay a phone display or other display and sense the motion of a finger or other object through ultrasonic signals generated by the transparent graphene-trough pump array.

Such a device can sense direct contact as well as three-dimensional motion well above the transparent display. It can also map out fingerprints and facial features using ultrasonic signals that can provide passive security for users.

A transparent graphene-trough pump system 2506 can perform multiple functions using audio or ultrasonic actuators and sensors such as a touch screen, motion sensor, microphone, speaker, gesture sensor, fingerprint sensor, three-dimensional imager, night vision system, mobile payments system and other functions from a single device.

Furthermore, embodiments of the present invention further have the benefit of allowing the audio output to be used as feedback to adjust the gating signals (voltage, timing, etc.). Unlike a cone speaker typically used, which has just one actuator, the speakers of the present invention is comprised of hundreds to thousands of small graphene-trough pumps. It is likely that some of these graphene-trough pumps will fail during manufacture and others may fail over time. In order to compensate for these failures, audio feedback can be used (from a small graphene microphone or conventional microphone) that will allow the device to produce the desired volume with the surviving graphene-trough pumps. This process is novel over the prior art since conventional speakers are not comprised of hundreds to thousands of individual actuators (i.e., if a cone actuator fails, the entire system fails). Moreover, the device can compare the resulting audio signal to a digital audio signal and automatically make adjustments to the gating signals to enable the audio output of the device to match the desired output as closely as possible.

Flying Device

Figure 26:
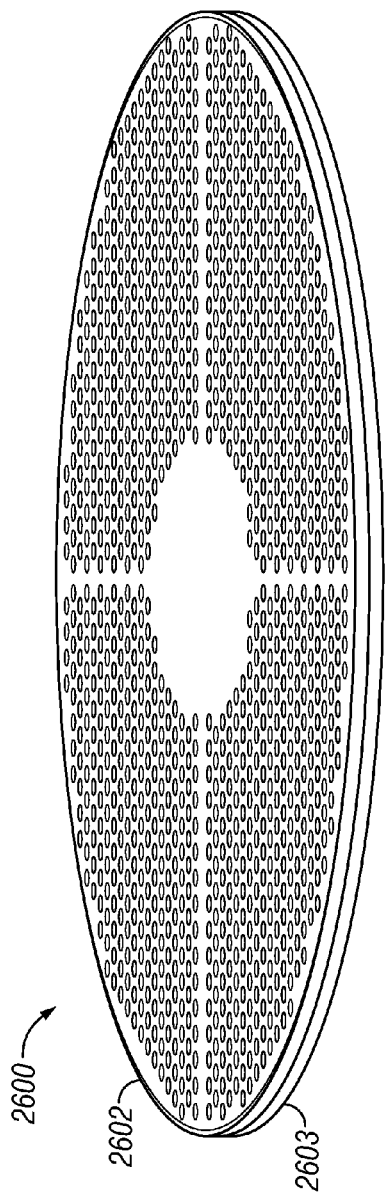
FIG. 26 depicts a perspective view of a flying device 2600 of the present invention capable of flight, which includes a graphene-trough pump system (which as depicted in FIG. 26 is separated into four sections).
Figure 27A:
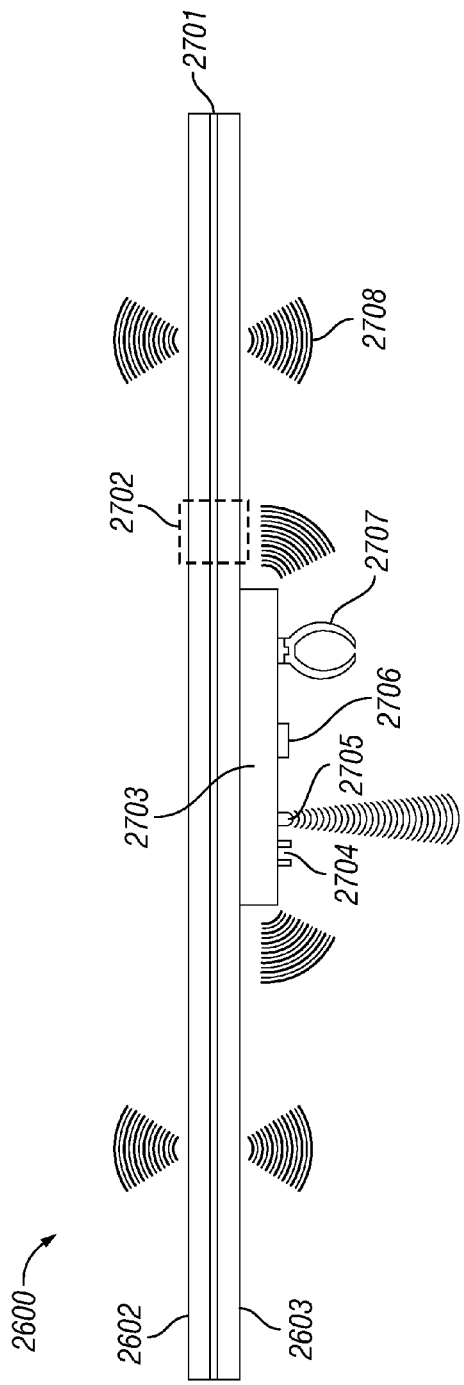
FIG. 27A depicts a side view of the flying device 2600 shown in FIG. 26.
Figure 27B:
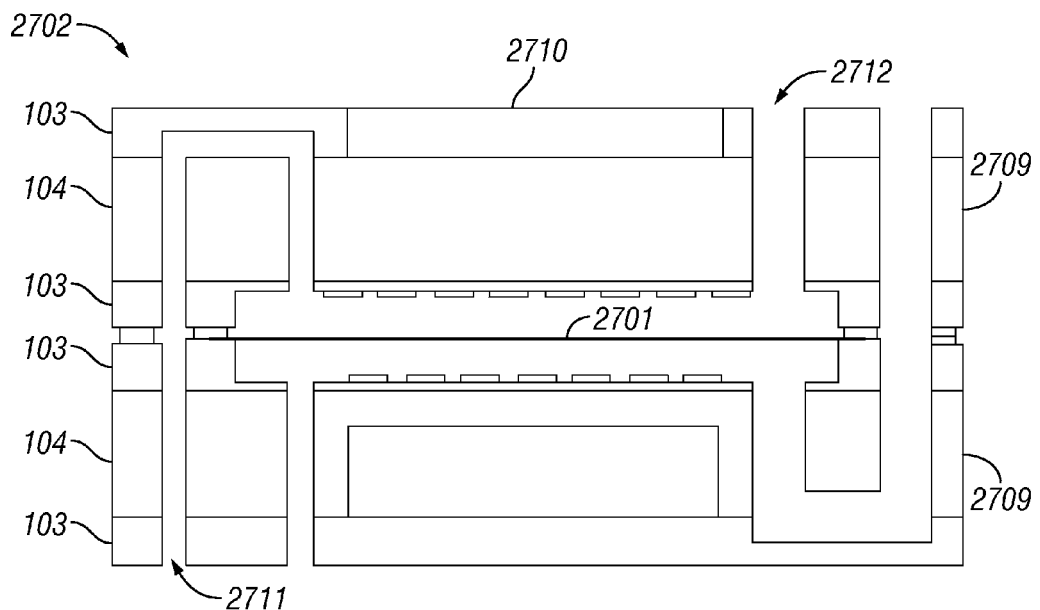
FIG. 27B depicts a magnified view of box 2702 shown in FIG. 27A, which box 2702 contains two graphene-trough pumps utilizing the same sheet of graphene 102.

FIG. 26 depicts a perspective view of a flying device 2600 of the present invention capable of flight, which includes a graphene-trough pump system (which as depicted in FIG. 26 is separated into four sections). FIG. 27A depicts a side view of the flying device 2600 shown in FIG. 26. FIG. 27B depicts a magnified view of box 2702 shown in FIG. 27A, which box 2702 contains two graphene-trough pumps utilizing the same sheet of double layer graphene 2701. FIG. 27B shows how the inlet vias (such as via 2712) are larger than the outlet vias (such as via 2711) so that desired sound from the bottom of the flying device 2600 is not cancelled by undesired sound emanating from the top of the flying device 2600.

Figure 28:
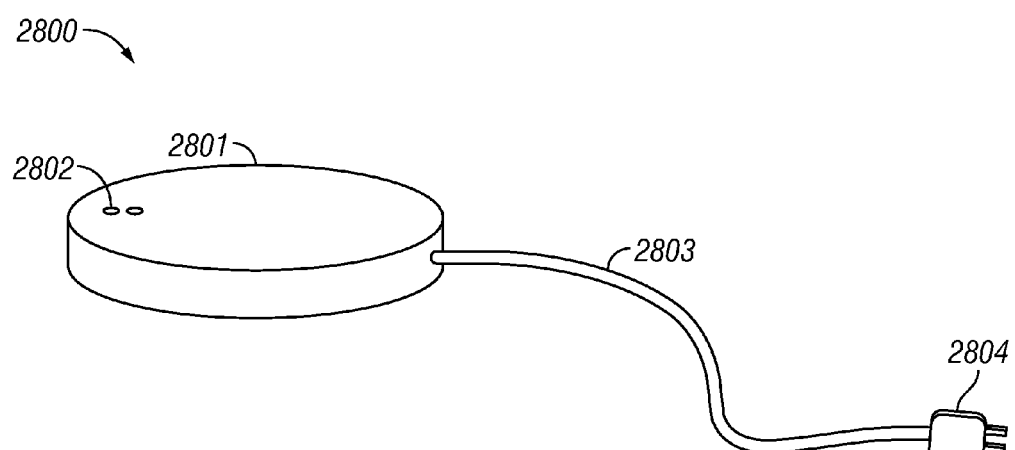
FIG. 28 depicts a stationary charger 2800 that the flying device 2600 can dock to recharge.
Figure 29A:
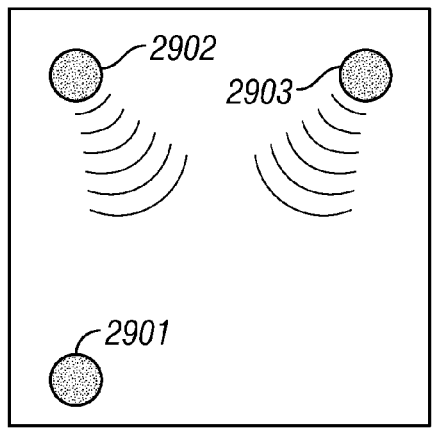
FIGS. 29A-29C depict how the flying devices (such as flying devices 2901, 2902, and 2903) may change position for recharging via the stationary charger 2800. Arrows 2904 show the movement of the flying devices 2901, 2902, and 2903.
Figure 29B:
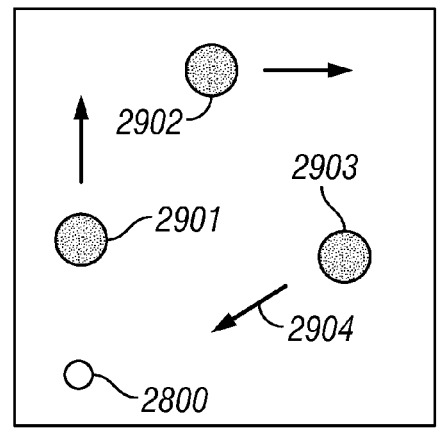
Figure 29C:
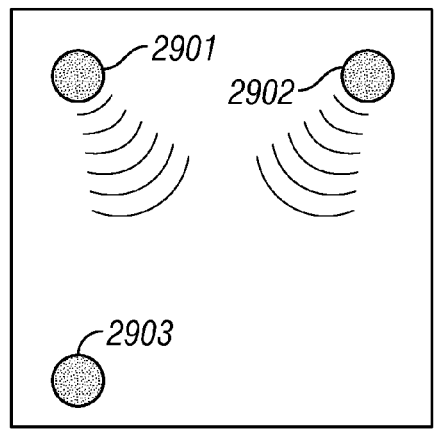

As shown in FIG. 27A, two thin graphene-trough pump systems are bonded together (similar to the valveless double-sided graphene-trough pump and system described and discussed above). This device can use a rechargeable battery 2703 that can be recharged (or discharged, as the case may be) by using the stationary charger 2800 shown in FIG. 28. Such chargers can be conductive, inductive, ultrasonic, etc. For example, and as shown, the rechargeable battery 2703 has electrodes 2704 that will engage with the holes 2802 in the stationary charger for such charging or discharge. Stationary charger 2800 can further include a docking portion 2801 upon which the flying device 2600 can dock. The docking portion 2801 can include electronics for docking of the flying disk (such as for alignment) and for the recharging and discharging of the rechargeable battery 2703. The stationary charger 2800 also can include a power cord 2803 and plug 2804 to attach to a power source or sink (not shown). FIGS. 29A-29C depict how the flying devices (such as flying devices 2901, 2902, and 2903) may change position for recharging via the stationary charger 2800. Arrows 2904 show the movement of the flying devices 2901, 2902, and 2903.

The flying device 2600 can also use ultrasonic position sensors (including those that use graphene-trough pump systems for this purpose) to sense the position of nearby objects. By way of example, the graphene-trough pump system can emit an ultrasonic sound wave and the same or a different graphene-trough pump system can receive the resulting response (such as an echo). Optionally, the docking portion 2801 (or other docking station) can emit ultrasonic signals that can be received by the graphene-trough pump system that the flying device 2600 can use to locate and/or align with the docking portion 2801.

The flying device 2600 can also contain one or more lights 2705, cameras 2706, and electric grippers 2707 (for robotic assembly).

The material 2710 on the top surface of the flying device 2600 can be a solar cell that makes use of the same silicon wafer as the graphene-trough pump system. Such solar cells can harvest light energy when available.

Other than those embodiments that harvest energy, because the thrust-to-weight ratio of the graphene-trough pump system and other portions of the flying device 2600 is higher than other devices (like toy electric helicopters), the flying device 2600 should be able to remain aloft for a much longer time period (e.g., for an hour or more between recharge events).

Solar Energy Collection Device

Figure 30:
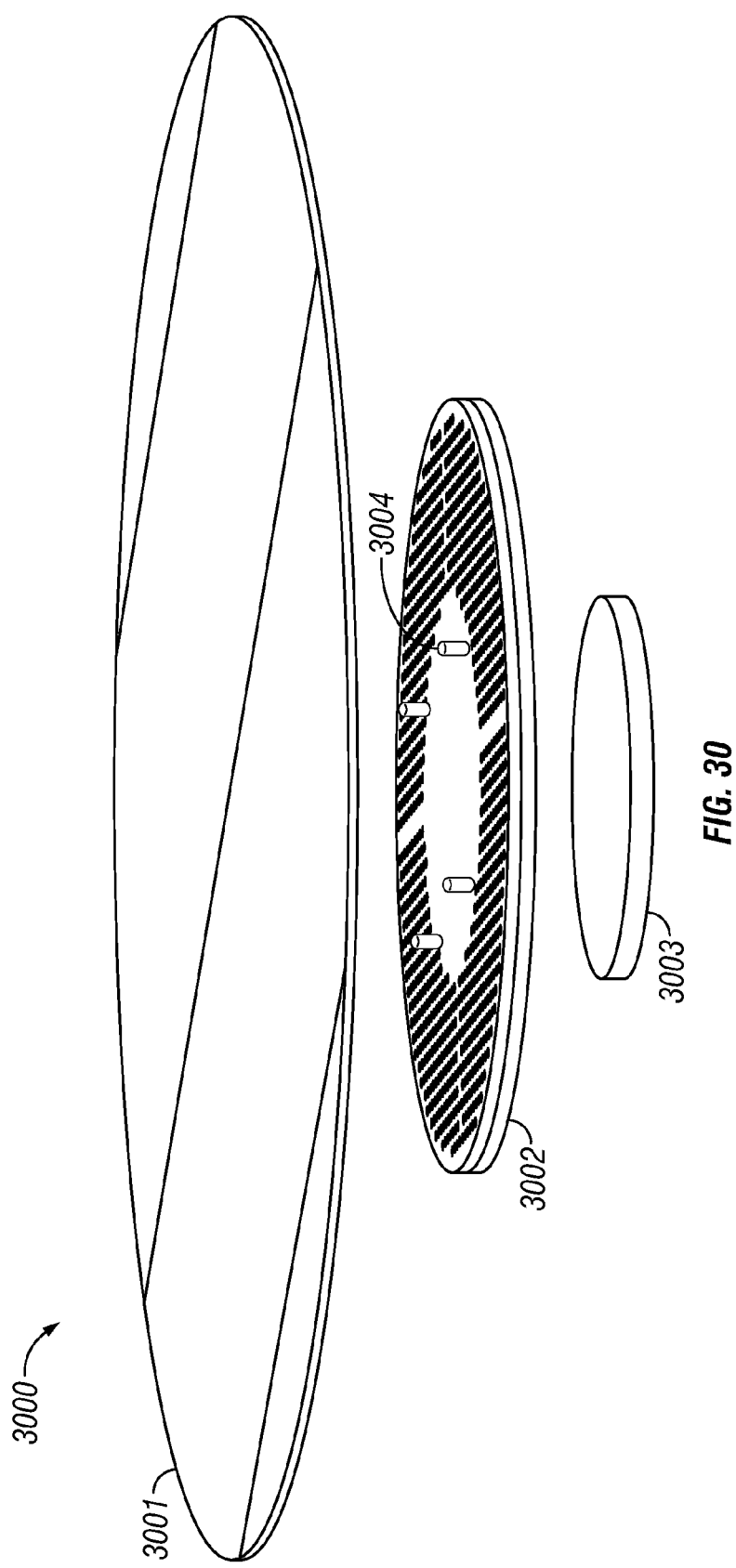
FIG. 30 depicts an exploded view of a solar energy collection device 3000 of the present invention capable of flight, which includes a photo voltaic (PV) cell array 3001, a flying disc 3002 (which includes a graphene-trough pump system, similar to the flying device 2600 shown in FIG. 26), and a rechargeable battery system 3003.

FIG. 30 depicts an exploded view of a solar energy collection device 3000 of the present invention capable of flight, which includes a photo-voltaic (PV) cell array 3001, a flying disc 3002 (which includes a graphene-trough pump system, similar to the flying device 2600 shown in FIG. 26), and a rechargeable battery system 3003. The rechargeable battery system can include other electronics, including those set forth for the flying device 2600, such as shown in FIG. 27A. FIG. 31 depicts a side view the solar energy collection device 3100 shown in FIG. 31.

Layer 3102 is a hydrophobic layer, such as polytetrafluoroethylene (Teflon® from DuPont Co.). This is to protect the electrical components of the flying device, such as from elements such as rain. The arrows 3103 show airflow needed to levitate the disk, which also cools the PV cell array 3001. The two electrodes 3101 on the rechargeable battery system 3003 are for transferring electrical energy from the battery system 3003 to a stationary or mobile receptacle (such as discussed above for flying device 2600). In addition to motion sensing electronics, this device may also employ GPS electronics to track its location.

While arrows 3103 in FIG. 31 show a top to bottom airflow for this device 3000, device 3000 (as well as other flying devices, such as flying device 2600) can utilize graphene-trough pump systems that have top/bottom/side to side airflow (i.e. air would exit at the outer periphery of the graphene pump disk). This will enable more efficient horizontal motion and also vertical motion (since it may be more efficient to gradually ascend like a plane). A combination of side and bottom airflow will also allow the device 3000 to maintain an angle relative to the sun without moving with respect to the ground.

Just as the top to bottom airflow graphene pumps can be separated into multiple sections (such as the four section shown) to allow the disk to achieve controlled flight, the top/bottom/side to side airflow graphene pumps can be separated multiple sections (i.e., three or more sections) to allow rapid changes in horizontal direction.

In an alternative embodiment, the rechargeable battery system 3003 may have a replaceable battery portion such that when the solar energy collection device 3000 (or other flying device 2600) comes to rest, a replacement battery portion can be replaced into the solar energy collection device 3000 allowing for the device 3000 to be immediately re-commissioned.

By way of example, the device 3000 can be released with a partially charged replacement battery portion that will allow the device to fly to a sunny location for harvesting energy. For instance, the device 3000 can rise to an altitude above cloud level to receive more intense and less blocked sunlight. Once the replacement battery portion is charged, the device 3000 can return to its base station. The replacement battery portion can be removed and a different replacement battery portion inserted into device 3000. The device 3000 can then return to a position to harvest solar energy.

Further, for example, the device 3000 can carry a replacement battery (in the rechargeable battery system 3003) for an electric/hybrid vehicle. The device 3000 can then track the electric/hybrid vehicle as it moves about. When the battery or one of many batteries in the electric/hybrid vehicle is drained below a certain threshold, the device can bring a replacement battery directly to the electric/hybrid vehicle (wherever it may then be) and the replacement battery can then be swapped for a drained battery of the electric/hybrid vehicle. The drained battery can then be placed into the rechargeable battery system 3003 of the device 3000, and the device 3000 can then proceed to recharge that drained battery.

Alternatively, in lieu of swapping the batteries of the device 3000 and the electric/hybrid vehicle, the electric/hybrid vehicle can have a docking station such that device 3000 is used to recharge the battery of the electric/hybrid vehicle.

As evident from this, these processes can be completed while the electric/hybrid car is stationary or in motion.

The electronics can also include sensors and a timer for return of the device 3000 (such as because of upcoming nightfall).

Device 3000 can have its graphene-trough pumps positioned in the system to allow for flight at various angles of device 3000. This will allow device 3000 to adjust itself due to flying conditions. The sensors and electronics of the device 3000 can be utilized for such purpose.

This will also allow the device 3000 to angle itself most directly into the sunlight (i.e., the photo voltaic (PV) cell array 3001 can be angled toward the sun). By device 3000's nature, this device 3000 would not need additional mechanical parts to properly position itself for solar harvesting. Indeed, such a device could be tethered (including with a lightweight cord for conducting electricity) and allowed to tilt appropriately.

The present invention can be utilized in other devices and systems to take advantageous of the small size and precise gas flow of the graphene-trough pump system. For instance, the small size and precise gas flow of the graphene-drum pump renders it useful in medical applications and consumer electronics applications (such as silent fans etc.).

A number of embodiments of the invention have been described. Nevertheless, it will be understood that various modifications may be made without departing from the spirit and scope of the invention. Accordingly, other embodiments are within the scope of the following claims.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. For example, graphene-trough pumps can be layered or stacked (for instance, vertically) to increase output. Also, the trough-shaped cavity does not have to precisely in the form of a trough. The cavity can also be in other shapes such that a traveling wave can move down the axis to facilitate the flow of a fluid (i.e., the use of the term "trough" does not limit the shape). Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. A method comprising the steps of:
   (a) selecting a device comprising (i) a mobile platform having a first surface and a second surface and (ii) an array of electrostatic pumps located within or on the mobile platform; and
   (b) operating the array of electrostatic pumps to fly the mobile platform above the ground, wherein the step of operating the array of electrostatic pumps comprises using the electrostatic pumps to create a flow of air from the first surface to the second surface to provide a thrust force to the mobile platform in a direction away from the ground greater than the gravitational force to the mobile platform in an opposite direction toward the ground.

2. A device comprising:
   (a) a mobile platform having a first surface and a second surface; and
   (b) an array of electrostatic pumps located within or on the mobile platform, wherein the array of electrostatic pumps is operable and positioned for pumping air from the first surface to the second surface to create an airflow that provides a thrust-to-weight ratio to allow the mobile platform to fly and remain aloft above the ground.

3. The device of claim 2 further comprising a solar cell.

4. The device of claim 2 further comprising a speaker.

5. The device of claim 2 further comprising a light.

6. The device of claim 2 further comprising a robotic gripper.

7. The device of claim 2 further comprising an ultrasonic sensor.

8. The device of claim 2 further comprising a GPS tracking system.

9. The device of claim 2 further comprising a battery.

10. The device of claim 9, wherein the battery is a rechargeable battery.

11. The device of claim 9, wherein the battery is removable from the device.

12. The device of claim 9 further comprising a solar cell, wherein the solar cell is operable for charging the battery.

13. The device of claim 2 further comprising a charging system.

14. The device of claim 13, wherein the charging system is stationary and connected to an electrical grid.

15. The device of claim 2 further comprising a filter system.

16. The device of claim 2 wherein the mobile platform comprises solar cell material that can be used as a solar cell.

17. The device of claim 16, where the solar cell material is operably useable as a solar cell.

18. The device of claim 16, wherein the material is silicon.

19. The device of claim 2, wherein the mobile platform comprises transparent material.

20. The device of claim 2, wherein array of pumps is operable to simultaneously produce the airflow and a sound.

21. The device of claim 20, wherein the sound in an ultrasonic sound.

22. The device of claim 21 further comprising an ultrasonic sound detector.

23. The device of claim 22, wherein
   (a) the ultrasonic sound detector comprises one or more pumps in the array of pumps; and
   (b) the one or more pumps are operable for detecting the ultrasonic sound.

24. The device of claim 23, wherein the device is operable to use the ultrasonic sound and the detection of the ultrasonic sound to detect the existence and position of objects.

25. The device of claim 2 further comprising a motion sensor.

26. The device of claim 25 further comprising a solar cell, wherein the array of pumps and the motion sensor are operable to position the device at an angle to increase solar power input to the solar cell.

27. The device of claim 25, further comprising a solar cell, wherein the array of pumps and the motion sensor are operable to position the device at an angle to maximize solar power input to the solar cell.

28. The device of claim 2, wherein the device is operable for recharging an electric or hybrid vehicle.

\* \* \* \* \*